(12) United States Patent
Papa et al.

(10) Patent No.: US 11,607,830 B2
(45) Date of Patent: Mar. 21, 2023

(54) MOLDING SYSTEM WITH MOVABLE SPLIT MOLD INSERTS

(71) Applicant: HUSKY INJECTION MOLDING SYSTEMS LTD., Bolton (CA)

(72) Inventors: Renato Papa, Oshawa (CA); Derek Robertson McCready, Mississauga (CA); Adrian Peter Looije, Aurora (CA)

(73) Assignee: HUSKY INJECTION MOLDING SYSTEMS LTD., Bolton (CA)

( * ) Notice: Subject to any disclaimer, the term of this patent is extended or adjusted under 35 U.S.C. 154(b) by 58 days.

(21) Appl. No.: 16/623,016

(22) PCT Filed: Jun. 11, 2018

(86) PCT No.: PCT/CA2018/050693
§ 371 (c)(1),
(2) Date: Dec. 16, 2019

(87) PCT Pub. No.: WO2018/232499
PCT Pub. Date: Dec. 27, 2018

(65) Prior Publication Data
US 2021/0170653 A1    Jun. 10, 2021

Related U.S. Application Data

(60) Provisional application No. 62/523,849, filed on Jun. 23, 2017.

(51) Int. Cl.
*B29C 45/44*    (2006.01)
*B29C 45/26*    (2006.01)
(Continued)

(52) U.S. Cl.
CPC ............ *B29C 45/44* (2013.01); *B29C 45/261* (2013.01); *B29C 45/2618* (2013.01);
(Continued)

(58) Field of Classification Search
CPC ............ B29C 45/2675; B29C 45/2618; B29C 45/261; B29C 45/44
See application file for complete search history.

(56) References Cited

U.S. PATENT DOCUMENTS 4,140,468 A    2/1979 Duga
5,736,173 A    4/1998 Wright et al.
(Continued)

FOREIGN PATENT DOCUMENTS

CN    2008800137134 A    4/2008
WO    2008131515 A1    11/2008
(Continued)

OTHER PUBLICATIONS

International Search Report, Cuerrier, Pierre, dated Aug. 7, 2018, 3 pages.

*Primary Examiner* — Matthew J Daniels
*Assistant Examiner* — Wayne K. Swier

(57) ABSTRACT

Disclosed herein, amongst other things, is, a stripper assembly operable to eject a molded article from a mold that includes slides that are movable laterally relative to each, a first split mold insert inter-connected to a first slide and a second split mold insert inter-connected to a second slide. The system being operable such that when the first and second slides are in the closed position, the first and second split mold inserts form at least a portion of the molding cavity; the system being operable such that such during operation of the injection molding system, the first split mold insert is movable relative to the respective first slide and the second split mold insert being movable relative to the second slide.

7 Claims, 24 Drawing Sheets

(51) Int. Cl.
*B29C 45/33* (2006.01)
*B29C 45/40* (2006.01)
*B29L 1/00* (2006.01)
*B29L 31/00* (2006.01)

(52) U.S. Cl.
CPC ........ *B29C 45/2675* (2013.01); *B29C 45/332* (2013.01); *B29C 2045/4078* (2013.01); *B29L 2001/00* (2013.01); *B29L 2031/7158* (2013.01)

(56) References Cited

U.S. PATENT DOCUMENTS

| | | | |
|---|---|---|---|
| 7,128,865 B2 | 10/2006 | Martin | |
| 7,568,906 B2 | 8/2009 | Kmoch et al. | |
| 7,575,429 B2 | 8/2009 | Mai et al. | |
| 7,628,605 B2 | 12/2009 | Mai et al. | |
| 7,713,054 B2 | 5/2010 | Mai | |
| 7,798,804 B2 | 9/2010 | Kmoch et al. | |
| 9,238,321 B2 | 1/2016 | Witz et al. | |
| 2005/0136150 A1* | 6/2005 | Martin | B29C 45/40 264/334 |
| 2008/0265463 A1* | 10/2008 | Finkelstein | B29C 45/2606 425/525 |
| 2008/0265467 A1* | 10/2008 | McCready | B29C 45/7207 425/526 |
| 2008/0268086 A1* | 10/2008 | Kmoch | B29C 45/332 425/525 |
| 2008/0268090 A1 | 10/2008 | Kmoch et al. | |
| 2009/0061043 A1 | 3/2009 | Fisch et al. | |
| 2009/0155404 A1* | 6/2009 | Mai | B29C 45/2606 425/525 |
| 2009/0166924 A1* | 7/2009 | Kuttappa | B29C 33/306 264/277 |
| 2012/0038076 A1* | 2/2012 | Lausenhammer | B29C 45/2675 264/39 |
| 2015/0360404 A1* | 12/2015 | Kmoch | B29C 45/2675 425/577 |

FOREIGN PATENT DOCUMENTS

| | | |
|---|---|---|
| WO | 2012045173 A1 | 4/2012 |
| WO | 2014117246 A1 | 8/2014 |
| WO | 2014131118 A1 | 9/2014 |

\* cited by examiner

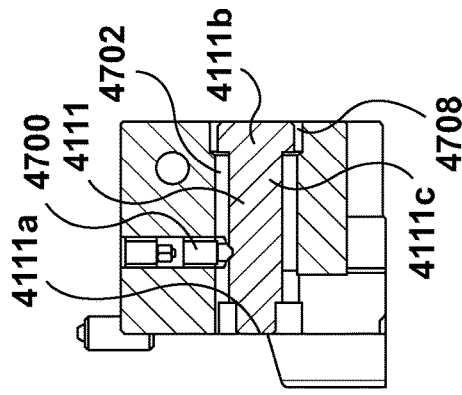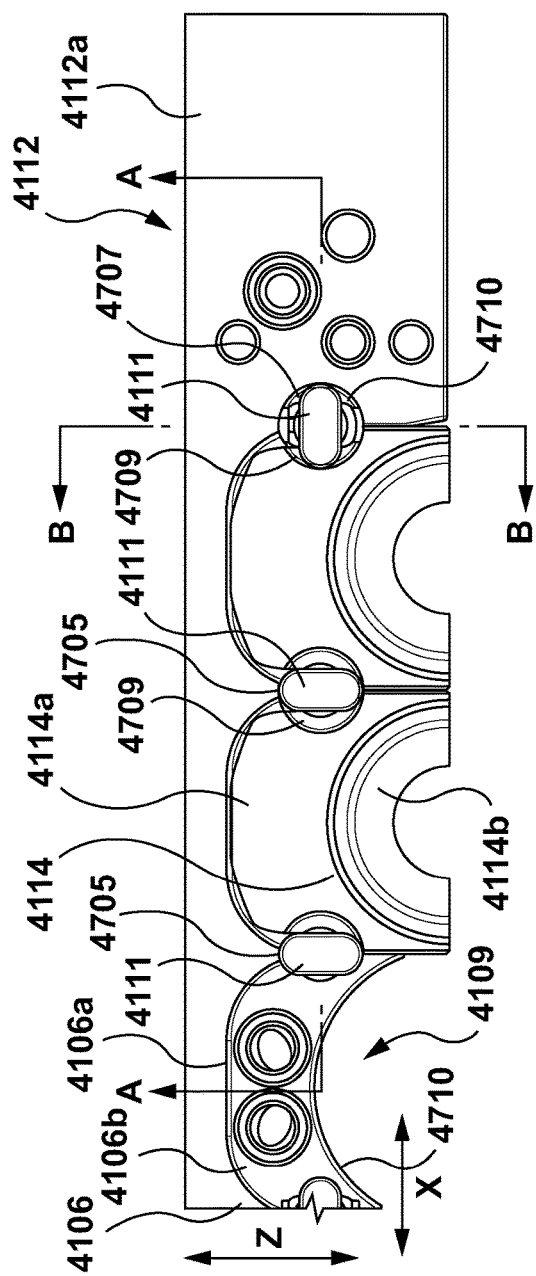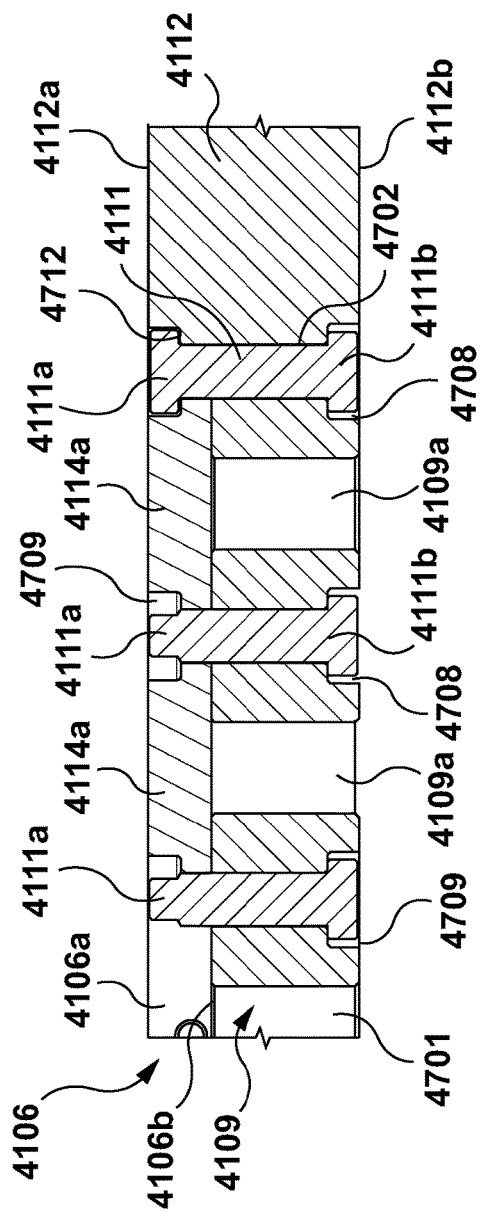

MOLDING SYSTEM WITH MOVABLE SPLIT MOLD INSERTS

TECHNICAL FIELD

This disclosure generally relates to, but is not limited to, molding systems, and more specifically relates to, but is not limited to, a mold stack with movable split mold inserts/neck rings, molding systems incorporating the same and methods of aligning the mold stack, at least in part, using movable split mold inserts/neck rings.

BACKGROUND

Molding is a process by which a molded article can be formed from molding material by using a molding system. Various molded articles can be formed by using the molding process, such as an injection molding process. One example of a molded article that can be formed, for example, from polyethylene terephthalate (PET) material, is a preform that is capable of being subsequently blown into a beverage container, such as a bottle or the like.

A typical injection molding system includes an injection unit, a clamp assembly and a mold assembly. The injection unit may be a reciprocating screw type or may be a two-stage type. The clamp assembly may include inter alia a frame, a movable platen, a fixed platen and an actuator for moving the movable platen and to apply tonnage to the mold assembly arranged between the platens. The mold assembly may include, inter alia, a cold half and a hot half. The hot half is usually associated with one or more cavities (and, hence, also sometimes referred to by those of skill in the art as a "cavity half"), while the cold half is usually associated with one or more cores (and, hence, also sometimes referred to by those of skill in the art as a "core half"). The one or more cavities together with one or more cores define, in use, one or more molding cavities. The hot half can also be associated with a melt distribution system (also referred to sometimes by those of skill in the art as a "hot runner") for melt distribution. The mold assembly can be associated with a number of additional components, such as split mold inserts/neck rings, slides, ejector structures, wear pads, etc.

As an illustration, injection molding of PET material involves heating the PET material (e.g. PET pellets, PEN powder, PLA, etc.) to a homogeneous molten state and injecting, under pressure, the so-melted PET material into the one or more molding cavities defined, at least in part, by the aforementioned one or more cavities and one or more cores mounted respectively on a cavity plate and a core plate of the mold assembly. The cavity plate and the core plate are urged together and are held together by clamp force, the clamp force being sufficient enough to keep the cavity and the core pieces together against the pressure of the injected PET material. The molding cavity has a shape that substantially corresponds to a final cold-state shape of the molded article to be molded. The so-injected PET material is then cooled to a temperature sufficient to enable ejection of the so-formed molded article from the mold. When cooled, the molded article shrinks inside of the molding cavity and, as such, when the cavity and core plates are urged apart, the molded article tends to remain associated with the core. Accordingly, by urging the core plate away from the cavity plate, the molded article can be demolded, i.e. ejected from the core piece. Typically, neck rings pairs must be separated to allow the molded articles to be ejected from the molds. Ejection structures are known to assist in removing the molded articles from the core halves. Examples of the ejection structures include stripper plates, ejector pins, etc.

SUMMARY

In one aspect, the present disclosure relates to an injection molding system that comprises a mold comprising a first mold half and a second mold half movable in an axial direction relative to each other between a first open position, and a second closed position in which the first mold half and the second mold half together provide a molding cavity; a mold stack comprising a plurality of components that are associated with the first and second mold halves to co-operatively define the molding cavity when the first and second mold halves are in the closed position; a stripper assembly operable to eject a molded article from the mold; the stripper assembly comprising first and second slides; the first and second slides being movable laterally relative to each other between an open position when the first and second mold halves are in the open position and a closed position when the first and second mold halves are in the closed position; a first split mold insert inter-connected to the first slide; a second split mold insert inter-connected to the second slide; the system being operable such that when the first and second slides are in the closed position, the first and second split mold inserts form at least a portion of the molding cavity; the system being operable such that such during operation of the injection molding system, the first split mold insert is movable relative to the respective first slide and the second split mold insert being movable relative to the second slide.

In another aspect, the present disclosure relates to a split mold insert apparatus connected to a slide of an injection molding system, the slide operable for lateral movement, the neck ring apparatus that comprises a split mold insert comprising a body having an inner surface configured in use to form a surface of part of mold cavity for forming at least part of a neck region of an article; a support device operable to support the split mold insert; the split mold insert apparatus being to configured and operable such during operation of the injection molding system, the split mold insert is movable relative to the support device.

In another aspect, the present disclosure relates to an injection molding system that comprises a mold comprising a first mold half and a second mold half movable relative to each other between a first open position, and a second closed position in which the first mold half and the second mold half together provide a molding cavity; a mold stack comprising a plurality of components that are associated with the first and second mold halves to co-operatively define the molding cavity when the first and second mold halves are in the closed position; a stripper assembly operable to eject a molded article from the mold; the stripper assembly comprising first and second slides; the first and second slides being movable laterally relative to each other between an open position when the first and second mold halves are in the open position and a closed position when the first and second mold halves are in the closed position; a first split mold insert inter-connected to the first slide; a second split mold insert inter-connected to the second slide; the system being operable such that when the first and second slides are in the closed position, the first and second split mold inserts form at least a portion of the molding cavity; the system being operable such that during operation of the injection molding system when that first and second mold halves are moving to the closed position, the first split mold insert is movable relative to the respective first slide and the second split mold insert being movable relative to the second slide to facilitate alignment of at least one component of the mold stack that is adjacent to at least one of the first and second split mold inserts.

These and other aspects and features of embodiments of the present invention will now become apparent to those skilled in the art upon review of the following description of specific non-limiting embodiments of the invention in conjunction with the accompanying drawings.

DESCRIPTION OF THE DRAWINGS

A better understanding of the embodiments of the present invention (including alternatives and/or variations thereof) may be obtained with reference to the detailed description of the exemplary embodiments along with the following drawings, in which:

FIG. 14 is a top plan view of the slider and neck ring halves of FIGS. 11A and 11B with a neck ring halve and removed from the slider;

FIG. 14A is a cross sectional view at A-A in FIG. 14;

FIG. 14B is a cross sectional view at B-B in FIG. 14;

The drawings are not necessarily to scale and are may be illustrated by phantom lines, diagrammatic representations and fragmentary views. In certain instances, details that are not necessary for an understanding of the exemplary embodiments or that render other details difficult to perceive may have been omitted.

DETAILED DESCRIPTION OF THE NON-LIMITING EMBODIMENT(S)

There exists a premature wear problem associated with various components of some known injection molding systems. Premature wear problems may be attributable, at least in part, to one or more of the following issues: (a) excessive clamping force, (b) insufficient clamping force, (c) process parameters of filling the molding cavity with the melt, (d) geometry of the mold stack components, (e) platen parallelism (or lack thereof), (f) number of cavities in a given size of a cavity plate, (g) material used for various mold stack components (ex. tapers, etc.) and (i) relative position of various mating mold stack components (ex. mis-alignment of individual mating mold stack components). The premature wear problem may be attributable to other issues.

Also, in some known systems, with a mold stack of a given size, the clamping force is not distributed equally along a cross-section of the mold stack that traverses an operational axis of a molding system. During operation, components of the mold stack may be misaligned when the two mold halves are being brought together. Attempts have been made to enhance the ability of the components of the mold stack to self-align when the mold halves are being brought together.

Figure 1:
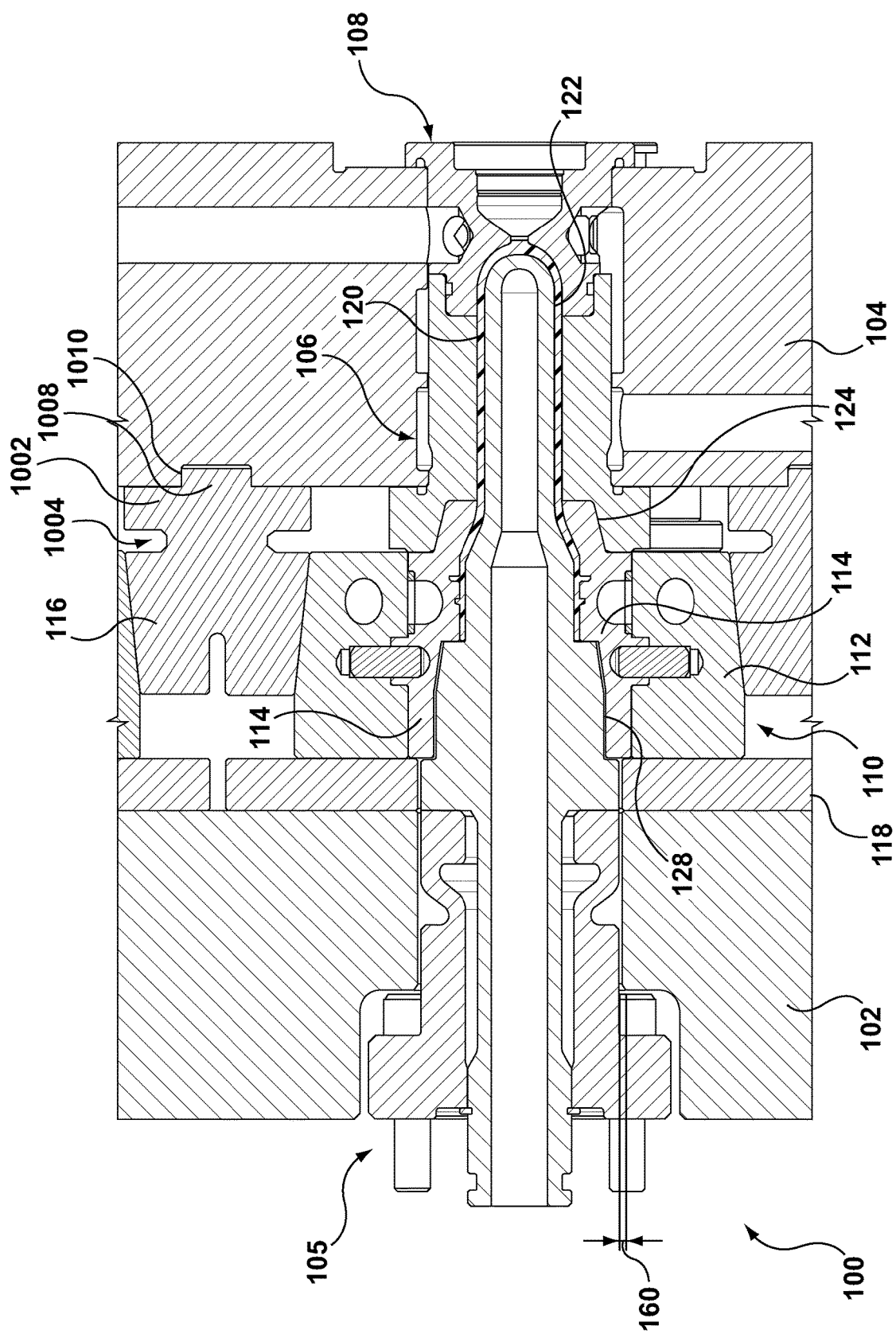
FIG. 1 is a cross-section view of a portion of a known mold stack.

For example, with reference to FIG. 1, there is depicted a portion of a mold stack 100 which is disclosed in U.S. Pat. No. 7,575,429, and assigned to Assignee of the present patent application, the entire contents of which are hereby incorporated herein in their entirety. Mold stack 100 comprises a stripper plate 102 and a cavity plate 104. Even though not shown in FIG. 1, the mold stack 100 may typically further comprise a core plate, which may abut the stripper plate 102 at a rear extremity thereof vis-a-vis the cavity plate 104. There is also provided a core insert 105, which is associated with a core plate (not depicted) and is positioned, in use, through aperture(s) in the stripper plate 102. Associated with the cavity plate 104 are a cavity insert 106 and a gate insert 108.

When dealing with molding an article such as a preform, one consideration that needs to be addressed is forming a so-called "neck region". Typically and as an example, the neck region may include: (i) threads (or other suitable structures) for accepting and retaining a closure assembly (ex. a bottle cap); (ii) an anti-pilferage assembly to cooperate, for example, with the closure assembly to indicate whether the end product (e.g. a beverage container that has been filled with a beverage and shipped to a store) has been tampered with in any way. The neck region may comprise other additional elements used for various purposes. However, the neck region can't be easily formed by using the cavity and core halves. Traditionally, split mold inserts (sometimes embodiments of which are referred to by those skilled in the art as "neck rings") have been used to form the neck region.

Accordingly, coupled to the stripper plate 102 and disposed intermediate the stripper plate 102 and the cavity plate 104, may be a split mold insert assembly 110. The split mold insert assembly 110 may comprise a plurality of slides 112, only two of which are depicted in FIG. 1. Coupled to each of the pair of slides 112 are split mold inserts 114, also often referred to by those of skill in the art as "neck ring" halves because the split mold insert, at least in part, defines the surface of the cavity that defines a neck region of a molded article. Two split neck ring halves 114 form a split mold insert or neck ring pair.

In the specific non-limiting embodiment of FIG. 1, each neck ring half 114 may be coupled to a respective slide 112 in a so-called "front-face coupling arrangement", which is more particularly described in a patent application bearing U.S. Pat. No. 7,798,804 issued Sep. 21, 2010 and assigned to Assignee of the present patent application, the content of which is incorporated by reference herein in its entirety. However, in alternative embodiments the neck ring half 114 can be coupled to the slide 112 in other known arrangements, such as, for example, the typical "top-face coupling arrangement.

Also depicted in FIG. 1, is a retaining structure 116 coupled to the cavity plate 104. The retaining structure 116 cooperates with a respective one of the pair of slides 112 to position and to retain the respective one of the pair of slides 112 in an operating position.

Further depicted in FIG. 1, is a wear plate 118 coupled to the stripper plate 102, intermediate the stripper plate 102 and the pair of slides 112. A primary purpose of the wear plate 118 is to prevent substantial damage to the pair of slides 112 and/or the stripper plate 102 during lateral movement of the pair of slides 112 relative to each other. In alternative embodiments, the wear plate 118 can be omitted from the architecture of the mold stack 100. This is particularly applicable in those embodiments where an actuator that actuates the lateral movement of the pair of slides 112 provides for lifting of the pair of slides 112 relative to the stripper plate 102.

In mold stack 100 depicted in FIG. 1, core insert 105, cavity insert 106, gate insert 108 and neck ring halves 114 are depicted in a so-called mold closed position. Within the mold closed position, a portion of core insert 105, a portion of cavity insert 106, a portion of gate insert 108 and a portion of each of the two neck ring halves 114 cooperate to define a molding cavity 120. A shape of the molding cavity corresponds to a shape of a molded article 122. As noted above, the molded article 122 may comprise a preform that is capable of being subsequently blow-molded into a final-shaped article, such as beverage container. However, it should be expressly understood that the molded article 122 can be of any other shape and/or configuration that has a neck region. Accordingly, it should be clear that teachings herein apply to a mold stacks and molding systems incorporating mold stacks that can be configured to produce different types of molded articles including but not limited to, preforms, thin wall containers, closures and the like.

Also provided within FIG. 1, is a first interface 124 defined between the neck ring halves 114 and the cavity insert 106. In the specific embodiment illustrated, the first interface 124 comprises a pair of complementary tapers defined on neck ring halves114 and the cavity insert 106. There is also provided a second interface 126 defined between the core insert 105 and the neck ring halves 114. In the specific embodiment illustrated, the second interface 126 comprises a pair of complementary tapers defined on the split mold inserts 114 and the core insert 105.

As is described in the afore-referenced U.S. Pat. No. 7,575,429, mold stack 100 may comprise one or more "compensator(s)". For example, mold stack 100 can implement one or more of the following compensators: (a) a compensating core insert 105; (b) a compensating cavity insert 106; (c) a compensating gate insert 108; (d) a compensating retaining structure 116; and (e) a compensating coupling. In this embodiment of FIG. 1, in the process of alignment of various components of the mold stack 100 the neck ring halves114 are used as a master for alignment of various components of the mold stack 100. By way of example, when the mold stack 100 is urged into the operating position (i.e. the mold closed position), the pair of slides 112 cooperates with the pair of retaining structures 116, 116a to position the neck ring halves 114. Once the neck ring halves114 have been positioned, the core insert 105 is positioned vis-a-vis the neck ring halves 114. Recalling that (i) there exists the second interface 126 between the core insert 105 and the neck ring halves 114; and (ii) that core insert 105 can be implemented as a compensating core insert; the core insert 105 aligns its position with the position of the neck ring halves 114. Similarly, the cavity insert 106 is positioned vis-a-vis the neck ring halves 114. Recalling that (i) there exists the first interface 124 between the cavity insert 106 and the neck ring halves 114; and (ii) that cavity insert 106 can be implemented as a compensating cavity insert; the cavity insert 106 aligns its position with the position of the neck ring halves 114.

Similarly, as described in PCT patent application serial. no. PCT/CA2014/050041 filed on Jan. 21, 2014 [publication no. WO 2014/131118 A1] and also assigned to Assignee of the present patent application, the content of which is incorporated by reference herein in its entirety, a mold stack is disclosed that includes a cavity insert that may be positioned within a bore in a cavity plate in a loose fit arrangement, that allows for a degree of float, in a lateral direction, of the cavity insert relative to the cavity plate.

However in each of the aforementioned mold stacks, there is no disclosure of the neck ring halves being movable relative to their respective slides to which they are mounted. The inventors have recognized that an alternate or additional alignment mechanism may be introduced into a mold stack to provide for a split mold compensation whereby the neck ring halves of a mold stack may be movable relative to a supporting component of, or associated with, the respective slides.

Figure 2:
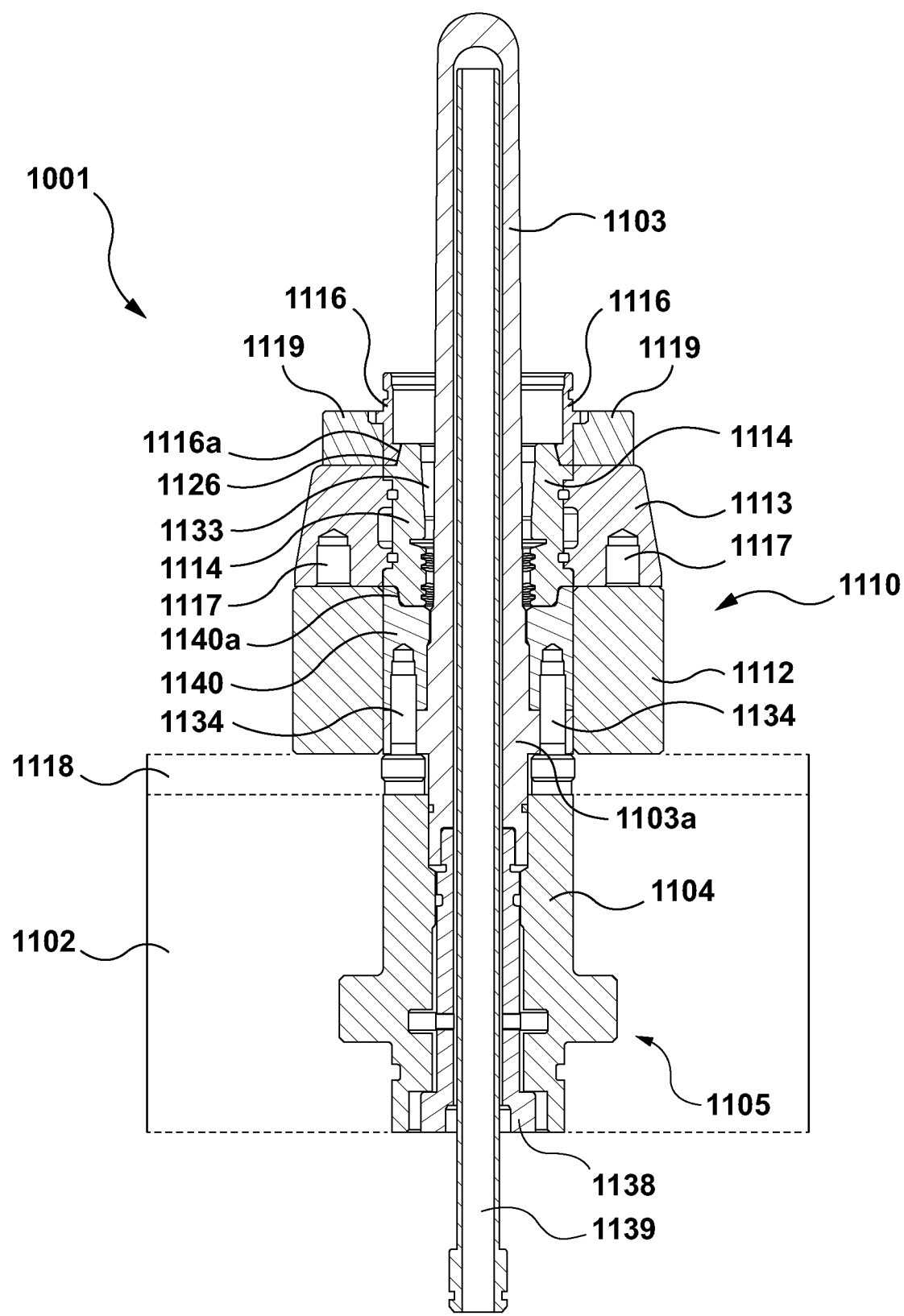
FIG. 2 is a cross-section view of an illustrative mold stack with a movable split mold insert.
Figure 3:
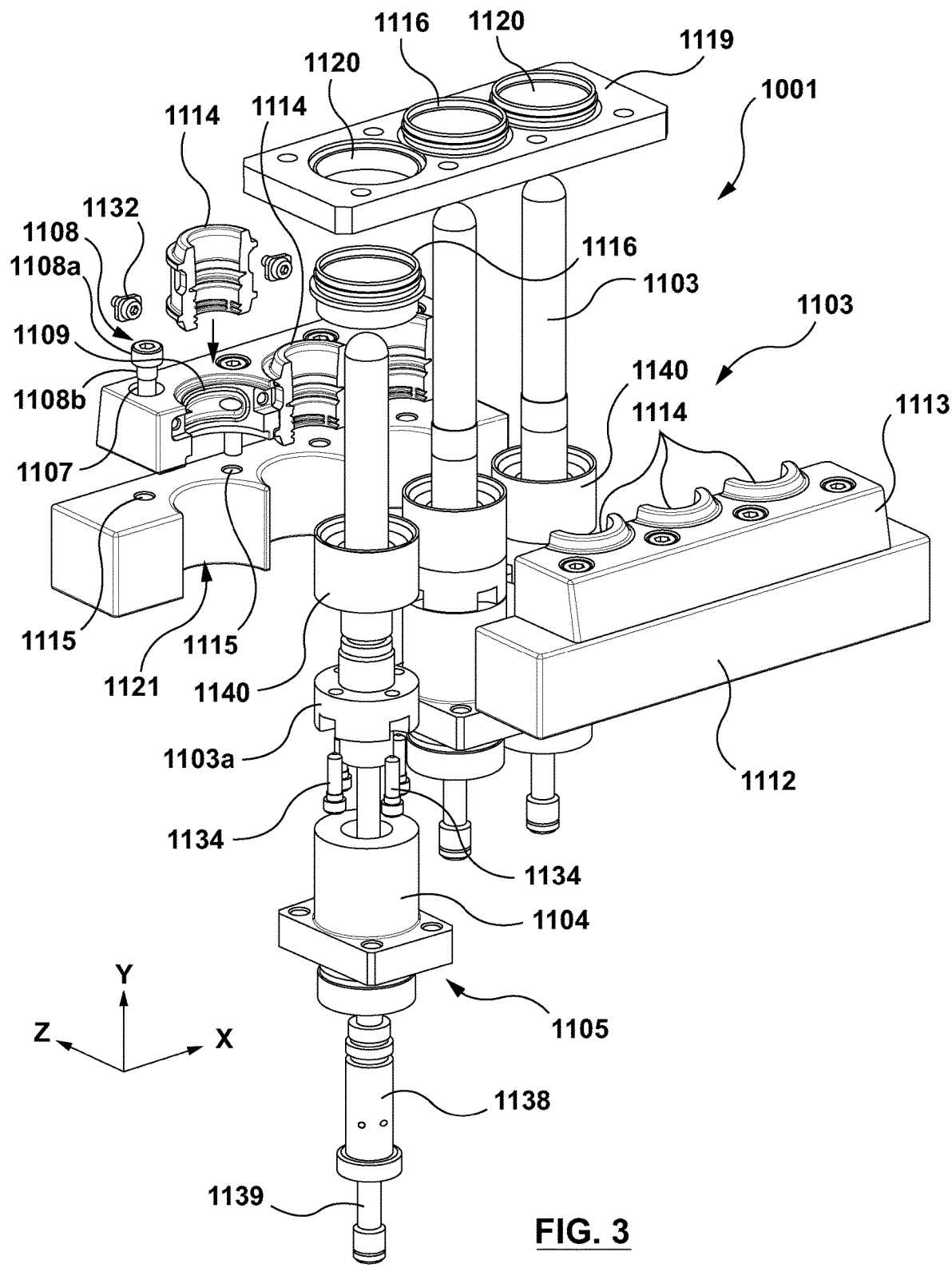
FIG. 3 is an exploded perspective view of some of the components of the mold stack of FIG. 2.

With reference now to FIGS. 2 and 3, components are illustrated of a core half 1001 of a mold stack that may be generally configured like the aforementioned and described mold stack 100 of FIG. 1. The generally known components of the mold stack may be made from materials commonly used in such injection molding systems. Core half 1001 may comprise a core plate (not shown) and a stripper plate 1102 (shown only in FIG. 2). Even though not shown in FIGS. 2 and 3, the core half 1001 of the mold stack may also provide that the core plate is in abutment with a stripper assembly that may include a stripper plate 1102 at a rear extremity thereof relative to the cavity side.

Core half 1001 may also include a core insert 1105, which is associated with the core plate and is positioned, in use, through aperture(s) in the stripper plate 1102 (FIG. 2). Core insert 1105 may include a core 1103 and a core support pedestal 1104. Core insert 1105 may also include a core cooling tube 1139 that extends axially within core 1103 and a core retaining bolt 1138 to retain core 1103 and associated components in position relative to stripper plate 1102.

Figure 5:
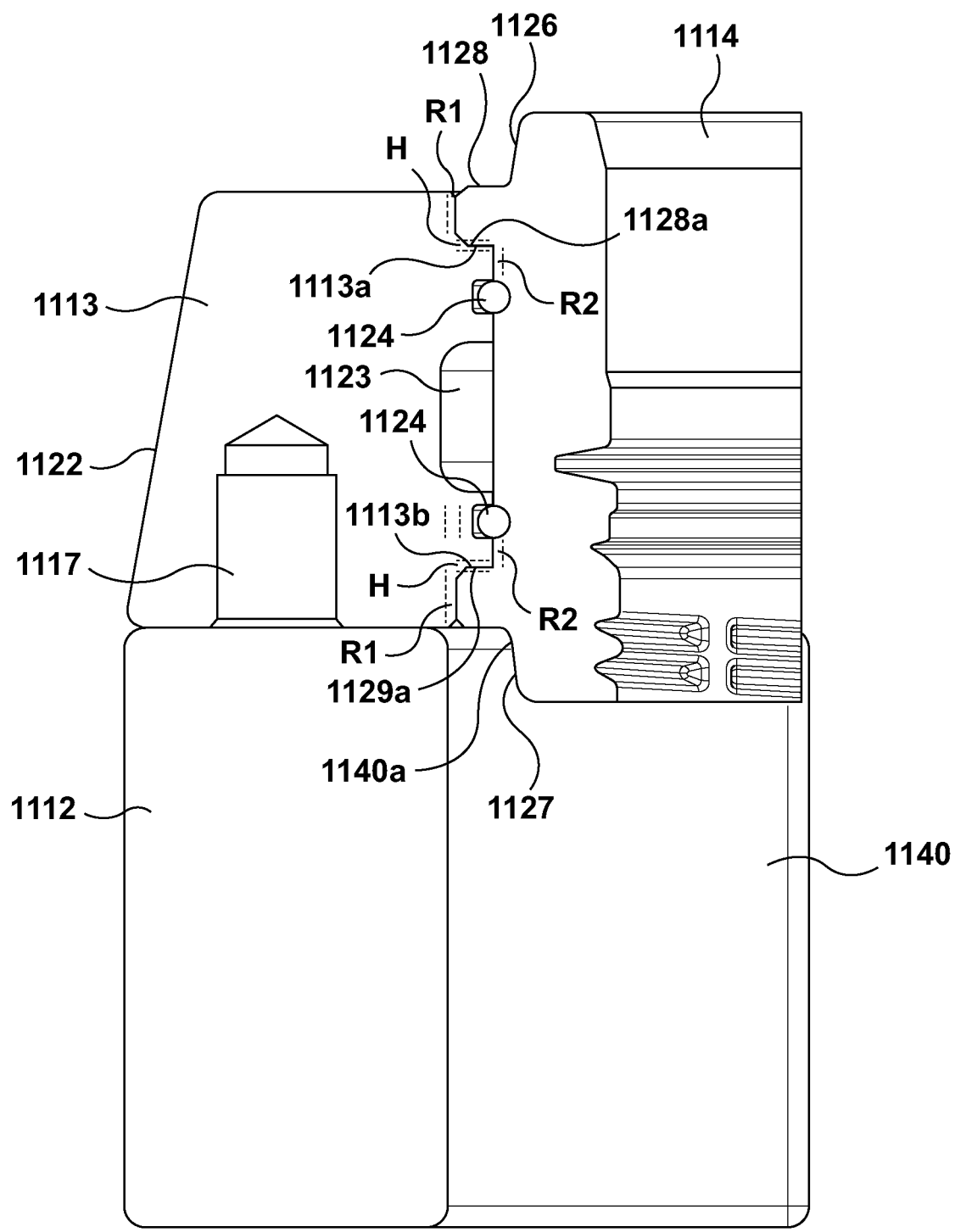
FIG. 5 is a side elevational section view of the components of FIG. 4.

A core alignment taper ring device 1140 may be secured to core 1103 by screw/bolts 1134 that pass through openings in a hub portion 1103a of core 1103 and have shafts that extend into threaded openings in a lower surface area of core taper alignment ring device 1140. Core alignment taper ring device 1140 may have an upper, female tapering annular interface surface 1140a which interfaces with a lower male annular tapered interface surface 1127 on each pair of neck ring halves 1114 (FIG. 5)

As part of the stripper assembly, and coupled to the stripper plate 1102 and disposed intermediate the stripper plate 1102, may be a split mold insert assembly 1110. The split mold insert assembly 1110 may comprise one or a plurality of pairs of slides 1112, only one mating pair of which are depicted in FIGS. 2 and 3. Coupled to each of the pair of slides 1112 may be one or more pairs of respective mating neck ring holders 1113 which may act as support devices for one or more neck ring halves 1114. Each neck ring holder 1113 may be fixedly attached to the respective slide 1112 in a suitable coupling arrangement. In alternate embodiments, a mechanism may be provided that allows for movement between the neck ring holders 1113 and the respective slide 1112 to which it is mounted. The movement of the neck ring holders 1113 relative to the respective slide 1112 may be useful in compensating for common misalignment between a plurality of neck ring halves 1114.

However, if only movement of the neck ring holders 1113 were provided relative to the slide and there was no movement permitted between the neck ring holders 1113 and the neck ring halves 1114 (as described below), then misalignment of individual neck rings halves 1114 of a plurality of neck ring halves mounted to a common neck ring holder 1113 may not be effectively compensated for to the same extent as where each neck ring halve 1114 is movable relative to its respective neck ring holder 1113 and/or respective slide 1112.

As illustrated, each neck ring holder 1113 may be configured to hold a one or a plurality of neck ring halves 1114. Each neck ring holder 1113 may, for example, be fixedly attached to a respective slide 1112 by virtue of screws/bolts 1108 having heads 1108a and shafts 1108b being received into cylindrical recessed openings 1107 that extend there through. Heads 1108a may be secured in recessed openings 1107 and shafts 1108b may pass through openings 1107 and extend into threaded openings 1115 in neck ring holders 1113 such that neck ring holders 1113 can be securely affixed to slides 1112. With reference to FIGS. 2 and 5, the connection between rings holders 1113 and the respective slides 1112 may be enhanced by dowel connections 1117.

Each slide 1112 of a pair of mating slides 1112, may have attached thereto a plurality of respective mating neck ring holders 1113 positioned longitudinally (direction X in FIG. 3) in series along the length of a slide 1112. By providing multiple neck ring holders 1113 on each slide 1112, this may assist in manufacturing/assembly/replacement of neck ring holders 1113 and may assist in the replacement/substitution of different neck ring halves 1114, in the molding system.

Each neck ring holder 1113 may be made from a different material than the slides 1112 or the neck rings halves 1114. Each slide 1112 may be made from conventional materials. Neck rings halves 1114 may also be made from conventional materials.

Neck ring holders 1113 have one or more tapered surfaces which may engage with interfacing surfaces of neck ring halves 1114, and hold the neck ring halves 1114 in a closed position when the mold is closed and material is being injected into the mold cavities. The material from which neck ring holders 1113 may be made may be particularly wear and corrosion resistant. For example neck ring holders may be made from grade 420 stainless steel hardened to Rockwell hardness 49-53RC using conventional techniques.

Each neck ring holder 1113 may have at opposed longitudinal ends, a generally transversely and vertically oriented, wedge interface surface 1122a and a generally longitudinally and vertically oriented wedge interface surface 1122b, both of which may be male tapered inwardly in an axial direction towards an upper surface of the neck ring holder 1113. Interface surfaces 1122a, 1122b may each, during operation when the mold halves are brought together, create wedge locking alignment effect with a corresponding interface surface on a component of the cavity half side, such as an interface surface of a cavity insert received in a cavity plate. The interface surface 1122b may create a wedge locking effect that holds opposing neck ring halves 1114 in a closed configuration when the mold is closed and clamped together.

Each neck ring holder 1113 may have a plurality of longitudinally spaced (i.e. in a direction X in FIG. 3) generally semi-cylindrical, axially oriented openings 1109. Receivable within each opening 1109 may be a generally semi-cylindrical neck ring half 1114 with generally semi-cylindrical inner and outer surfaces. When brought together in a lateral inward direction (direction Z in FIG. 3) two opposed neck ring halves 1114 form a complete neck ring forming part of a cavity 1133 (a portion of which is identified in FIG. 2). When located together, the neck ring may for example provide for a threaded surface for a neck region of the molded article.

Figure 6:
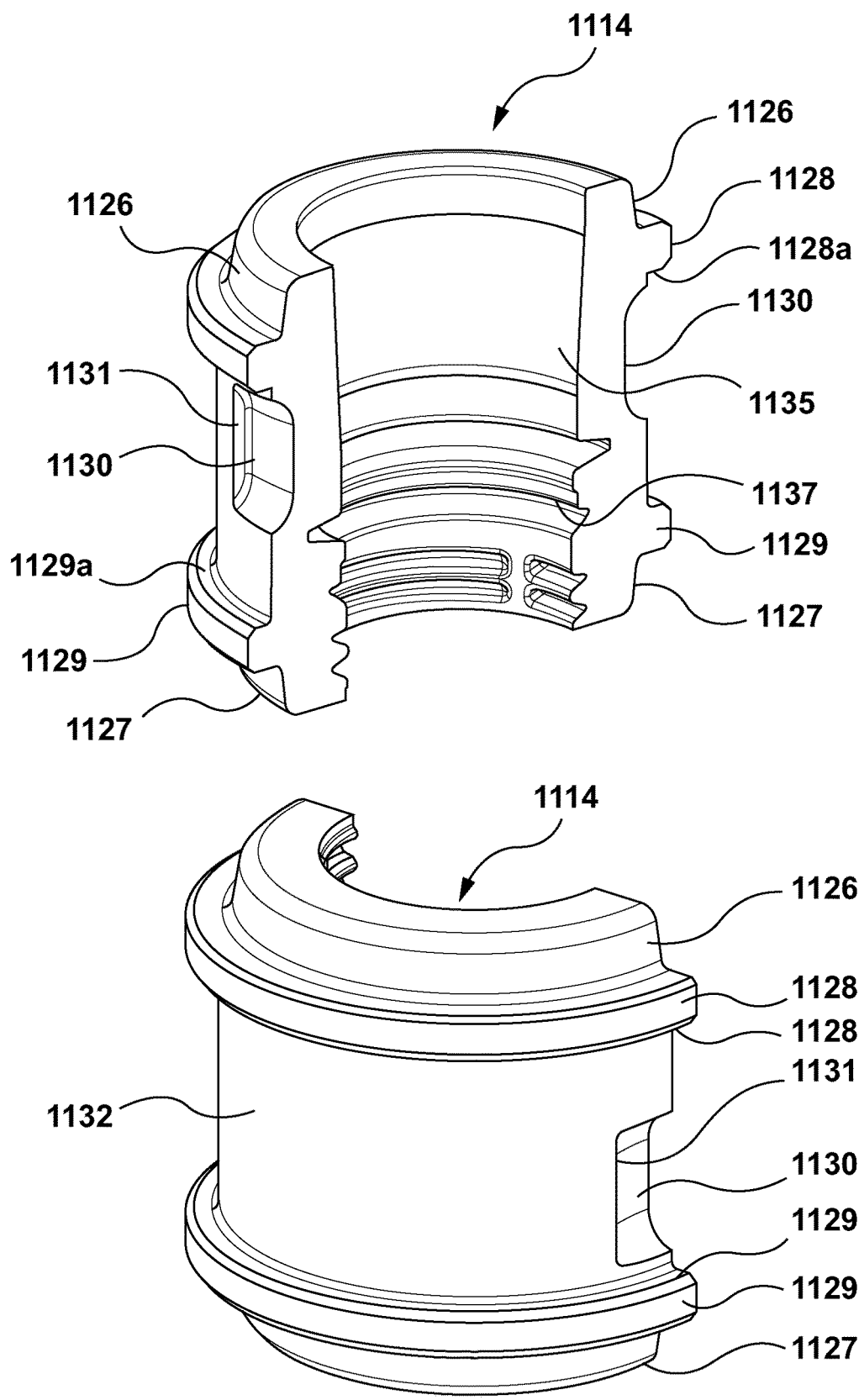
FIG. 6 provides perspective views of a neck ring half of the mold stack of FIG. 2.
Figure 7A:
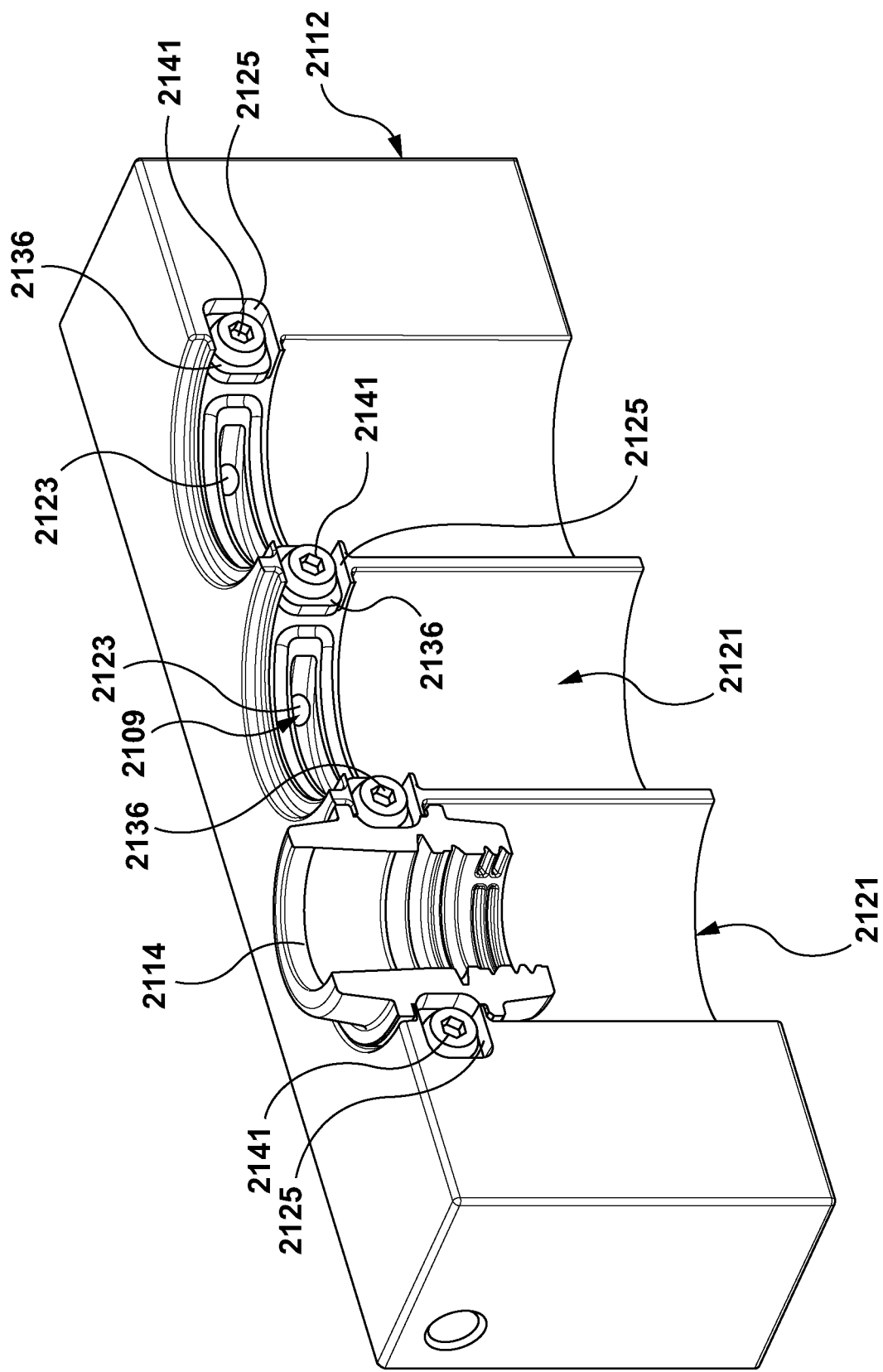
FIGS. 7A and 7B are perspective views of alternate sliders with neck ring halves.
Figure 7B:
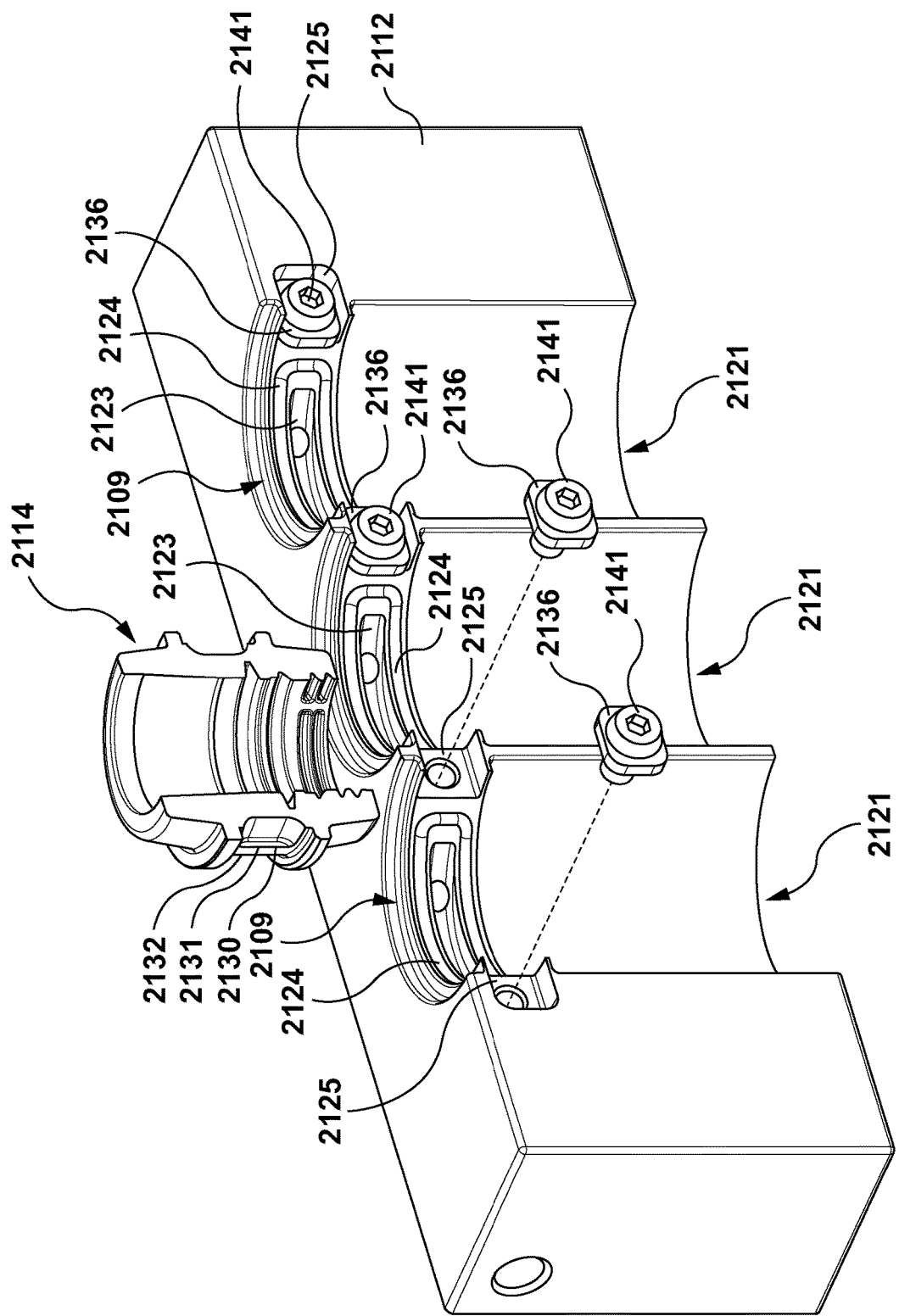

With particular reference to FIG. 6, each neck ring half 1114 may have a generally semi-cylindrical outer surface 1132 and a generally semi-cylindrical inner surface 1135. Inner surface 1135 may have a surface profile area 1137 that is suitable for forming a portion of the threads of a neck region for a molded article. Each neck ring half 1114 may also include a generally semi-circular upper flange 1128 and a generally semi-circular lower flange 1129. Located above upper flange 1128 may be an inwardly upwardly male tapered, interface surface 1126. Located below lower flange 1129 may be an inwardly downwardly male tapered, interface surface 1127.

Figure 4:
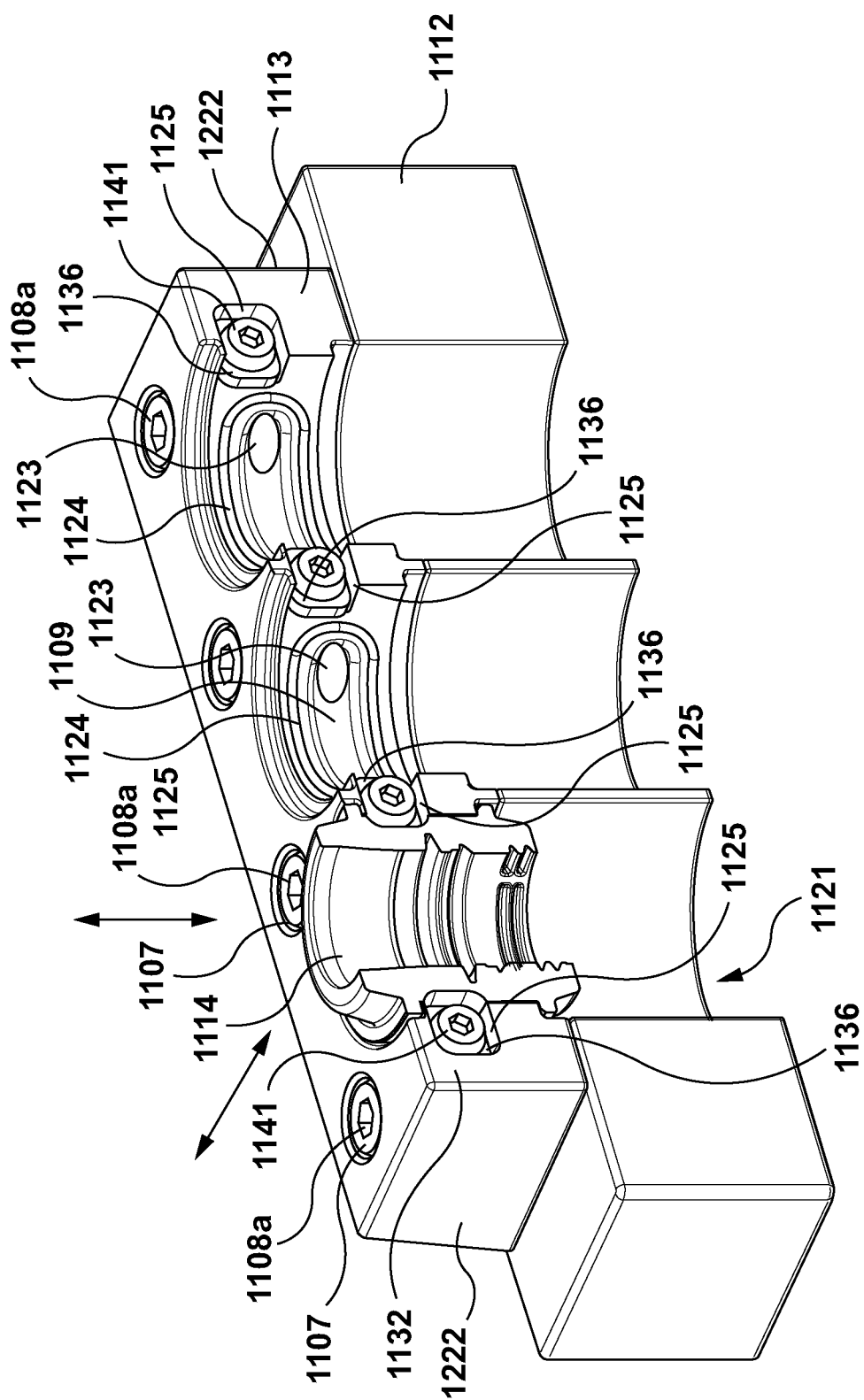
FIG. 4 is a perspective view of some of the components of the mold stack of FIG. 2.

The longitudinally and vertically oriented outward facing surface 1132 of the neck ring halves 1114 may include at each opposite ends, and at intermediate locations between each pair of adjacent openings 1109, a retaining recess 1130 having an inwardly set back and positioned, and radially and axially oriented, retaining surface 1131. As shown in FIG. 4, neck ring retainers 1136 may be provided. Neck ring retainers 1136 may be small plates made from a suitable material such as a metal such as grade 420 stainless steel.

Neck ring retainers 1136 may have apertures there through and may be configured to be received into recesses 1125 in neck ring holders 1113 and the recesses 1130 in neck ring halves 1114 (FIG. 5). Neck ring retainers 1136 may be fixedly secured in position within a recess 1125 and one or two recesses 1130 (depending upon whether recess 1125 is an end recess, or an intermediate recess on neck ring holder 1113) with screws 1141 passing through the central openings in retainers 1136, with the screws being held in threaded openings in retaining surfaces 1131 in recesses 1125. Each retainer 1136 may have its inward facing radially and axially oriented surface spaced apart from the retaining surface 1131 of the neck ring half/halves 1114. By positioning a neck ring retainer 1136 in each recess 1125 at either side of an opening 1109 and a neck ring half held therein, a neck ring half 1114 may be loosely retained within an opening 1109, as its retaining surface 1131 is unable to transversely move past the corresponding neck ring retainer 1136. However, neck ring retainers 1136 and the configuration of recesses 1130 permit a limited degree of both longitudinal/transverse (radial) movement and axial movement of each neck ring 1114 relative to the opening 1109 in which it is positioned.

When each neck ring half 1114 is held in an opening 1109, before the two mold halves are brought together during the injection molding process, the neck rings halves 1114 and corresponding openings 1109 are configured such that radial movement (both laterally and longitudinally) and axial movement are permitted of the neck ring halve 1114 relative to the opening 1109 of neck ring holder 1113. By way of example, there may be radial gaps R1 and R2 (see FIG. 5) around the entire semi-circumference between the outer surfaces of each neck ring half 1104 and the inward facing surfaces of neck ring holder 1113. These gaps R1 and R2 may, for example be each in the range of 30to 80 microns. Similarly, there may be a total height gap H of in the range of 30 to 80 microns between the transverse/longitudinal surfaces 1113a of the neck ring holders 1113 and the downward facing surfaces 1128a of upper flange 1128. And there may also be a total height gap H of in the range of 30 to 100 microns between the transverse/longitudinal surfaces 1113b of the neck ring holders 1113 and the upward facing surfaces 1129a of lower flange 1129.

Additionally, the shafts of screws 1141 are configured and positioned so as to permit the aforesaid radial movement of each neck ring half 1114 relative to the neck ring holder 1113.

The result of the foregoing, is that each neck ring half 1114 may move both radially (longitudinally/transversely) and axially relative to its neck holder 1113 and the respective slide 1112.

With particular reference to FIGS. 4 and 5, the interior surfaces defining semi-cylindrical openings 1109 in neck ring holders 1113 may include cooling channels 1123 formed between the outer surface 1132 of the neck ring half 114 and the corresponding interior adjacent inward facing generally semi-cylindrical surface of neck ring holder 1113 defining the opening 1109. Coolant may be fed though channels in the slide 1112 in communication with channels in ring holder 1113 to supply coolant to circulate through channels 1123. The channels 1123 in neck ring holders 1113 may be sealed by seal devices such as O-rings 1124 held in recesses in a rear portion of the interior, generally semi-cylindrical, surfaces defining openings 1109. O-rings 1124 may be resilient and elastically deformable and thus, in addition to performing a sealing function, also push against each neck ring half 1114 held in an opening 1109 to urge the neck ring half transversely outwards from the opening 1109.

A retaining structure (not shown) may be coupled to the cavity plate (not shown) which cooperates with a respective one of the pair of slides 1112 to position and to retain the pair of slides 1112 in an operating position.

Further depicted in FIG. 2, is a wear plate 1118 coupled to the stripper plate 1102, intermediate the stripper plate 1102 and the pair of slides 1112. The purpose of the wear plate 1118 is to prevent substantial damage to the pair of slides 1112 and/or the stripper plate 1102 during lateral movement of the pair of slides 112 relative to each other.

In a mold closed position, a portion of core insert 1105, a portion of the two neck ring halves 1114 and respective neck ring holders 1113 (along with a portion of a cavity insert and a portion of a gate insert not shown) cooperate to define a molding cavity 1133 (a portion of which is identified in FIG. 2). A shape of the molding cavity corresponds to a shape of a molded article, which may comprise a preform that is capable of being subsequently blow-molded into a final-shaped article, such as beverage container, or another shape and/or configuration.

Each cavity 1133 may have associated with it on the cavity plate side (not shown) a cavity side alignment taper ring device 1116. Each taper ring device 1116 may be mounted into a cylindrical opening 1120 in a cavity taper retainer plate 1119. Each taper ring device 1116 may be configured and mounted within cylindrical opening 1120 in such a manner that the taper ring device is capable of limited movement relative to the retainer plate 1119 in any one or more of X, Y and/or Z directions.

Still with reference to FIGS. 2 and 3, cavity taper retainer plate 1119 may be fixedly mounted to a cavity plate (not shown) on the cavity side. Each taper ring device 1116 has an annular inwardly downward female tapered interface surface 1116a (FIG. 2) which interfaces with an upper male tapered interface surface 1126 on each pair of neck ring halves 1114.

Taper retainer plate 1119 may have a set of corresponding cylindrical openings 1120 that correspond with the semi-cylindrical openings 1109 on opposed ring holders 1113 and are longitudinally (direction X) and transversely (direction Y) aligned therewith. Similarly, each of the corresponding slides 1112 may have a set has a set of corresponding semi-cylindrical openings 1121 that correspond with both cylindrical openings 1120 in taper retainer plate 1119 and semi-cylindrical openings 1109 in ring holders 1113, and are longitudinally (direction X) and transversely (direction Y) aligned therewith.

As indicate above, neck rings halves 1114 are generally semi-cylindrical in shape and are receivable within openings 1109 of neck ring holders 1113. Neck rings halves 1114 are capable of radial (transverse/longitudinal) movement and axial movement, when held in the openings 1109, as the mold halves are brought together, thus allowing for the movement of the neck rings 1114 to assist in properly aligning the core and core insert components with the cavity insert components.

The movable neck rings halves 1114 may assist in aligning the various components of a mold stack. For example, with reference to FIGS. 2 and 3, it may be appreciated that as the core mold half 1001 of the mold stack are brought together with the cavity mold half (not shown) of the mold stack, the lower interface surface 1127 of each neck ring half 1114 will engage with the corresponding tapered surface 1140a of core alignment taper ring device 1140. Similarly, the upper interface surface 1126 of each neck ring half 1114 may start to engage with the corresponding tapered surface 1116a of cavity alignment taper ring device 1116 to provide for a locking alignment engagement between the neck ring halves 1114 and the mating insert components. If there is no floating/freedom of movement of either the inserts of the core side, or the inserts of the cavity side relative to their respective mold plates, any misalignment of the core and cavity during the bringing together of the mold halves may be taken up entirely by the radial and/or vertical movement of the neck ring halves 1114 in their respective neck ring holders 1113.

In other embodiments, the mold stack including the neck ring halves 1114, may be differently configured and may be configured for locking alignment engagement with appropriate alignment interface surfaces on only one side the cavity side or the core side, or on neither side. In such alternate embodiments, a degree of movement compensation may be built into one or both of the inserts on the cavity side and the core side. In such embodiments, as the two mold halves are brought together during operation, the freedom of movement of the neck ring halves 1114 relative to neck ring holders 1113 and slides 1112 may supplement the movement compensation ability provided for in for example one or both of the cavity inserts and the core insert components.

With reference now to FIGS. 7A, 7B, 8A, 8B, 9A and 9B an alternate embodiment of a neck ring half 2114 and corresponding slide 2112 is illustrated. Neck ring halves 2114 may be configured substantially like neck ring halves 1114 described above. However, in this embodiment, there is no separate neck ring holder (like neck ring holder 1113 described above). Instead, slide 2112 provides a support device for the neck rings halves 2114. The semi-cylindrical openings in slide 2112 may include upper opening portions 2109 which may be generally configured like openings 1109 in ring holders 1113 as described above, and may include coolant channels 2123 formed between the outer surface of the neck ring halves 2114 and the inner generally cylindrical surfaces that defined openings 2109. The channels 2123 in the upper portions of slides 2112 may be sealed by seal devices such as O-rings 2124 held in recesses in a rear portion of the interior, generally semi-cylindrical, surfaces defining upper opening portions 2109 (see FIG. 8B). O-rings 2124 may be resilient and elastically deformable and thus function to tend to push against each neck ring half 2114 held in an opening 2109 to urge the neck ring half transversely outwards from the opening 2109.

Slides 2112 may also have a set has a set of corresponding lower semi-cylindrical openings 2121 that are aligned and positioned below semi-cylindrical openings 2109. Slides 2112, neck ring halves 2114 and slides 2112 may function and operate in a mold stack in a manner similar to the functioning and operation of slides 1112, neck ring holders 1113 and neck ring halves 1114 as described above.

The longitudinally and vertically oriented outward facing surface 2132 (FIG. 7B) of the neck ring halves 2114 may include at each opposite ends, and at intermediate locations between each pair of adjacent openings 2109, a retaining recess 2130 having an inwardly set back and positioned, and radially oriented, retaining surface 2131. Neck ring retainers 2136 (which may be small metal plates with apertures there through) may be configured to be received into recesses 2125 in slides 2112 and the recesses 1130 in neck ring halves 1114. Neck ring retainers 2136 may be fixedly secured in position within a recess 2125 and one or two recesses 21130 (depending upon whether recess 2125 is an end recess, or an intermediate recess on slide 2112) with screws 2141 passing through the central openings in retainers 2136, with the screws being held in threaded openings in retaining surfaces 2131 in recesses 2125. Each retainer 2136 may have its surface facing retaining surface spaced apart from the retaining surface 2131 of the neck ring half/halves.

By positioning a neck ring retainer 2136 in each recess 2125 at either side of an opening 2109, a neck ring half 2114 may be loosely retained within an opening 2109, as its retaining surface 2131 is unable to pass by the corresponding neck ring retainer 2136. However, neck ring retainers 2136 and the configuration of recesses 2130 permit a limited degree of longitudinal, transverse and axial movement of each neck ring half 2114 relative to the opening 1109 in which it is positioned.

When each neck ring half 2114 is held in an opening 2109, before the two mold halves are brought together, the neck rings halves 2114 and corresponding openings 2109 are configured such that radial movement (both laterally and longitudinally) and axial movement are permitted of the neck ring halve 2114 relative to the opening 2109. By way of example, there may be radial gaps R1 and R2 (see FIGS. 9A and 9B) around the entire semi-circumference between the outer surfaces of each neck ring half 2104 and the inward facing surfaces of slide 2112 defining openings 2109. These gaps R1 and R2 may, for example be each in the range of 30 to 80 microns. Similarly, there may be a total height gap H of in the range of 30 to 80 microns between the transverse/longitudinal surfaces of the slides 2112 and the downward facing surfaces of upper flange of the neck ring half. And there may also be a total height gap H of in the range of 30 to 100 microns between the transverse/longitudinal surfaces of the slides 2112 and the upward facing surfaces of lower flange of the neck ring halves 2114.

The screws 2141 may be configured so as not to interfere with the radial movement of the neck ring halves 2114 relative to the slides 2112 to which they are attached.

Figure 8A:
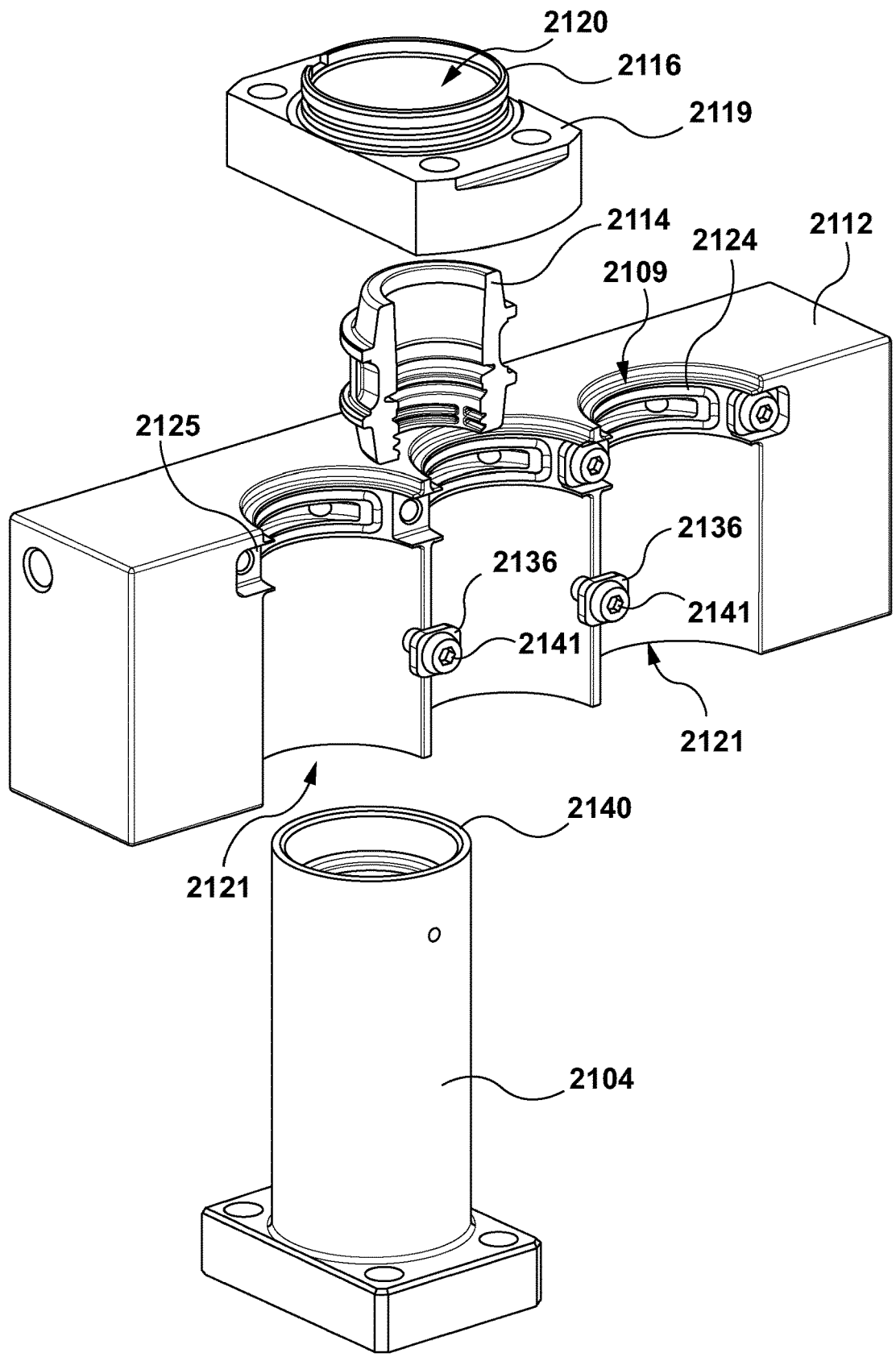
FIGS. 8A and 8B are an exploded perspective views of some of some components of an alternate mold stack employing the sliders holders and neck ring halves of FIGS. 7A and 7B.
Figure 8B:
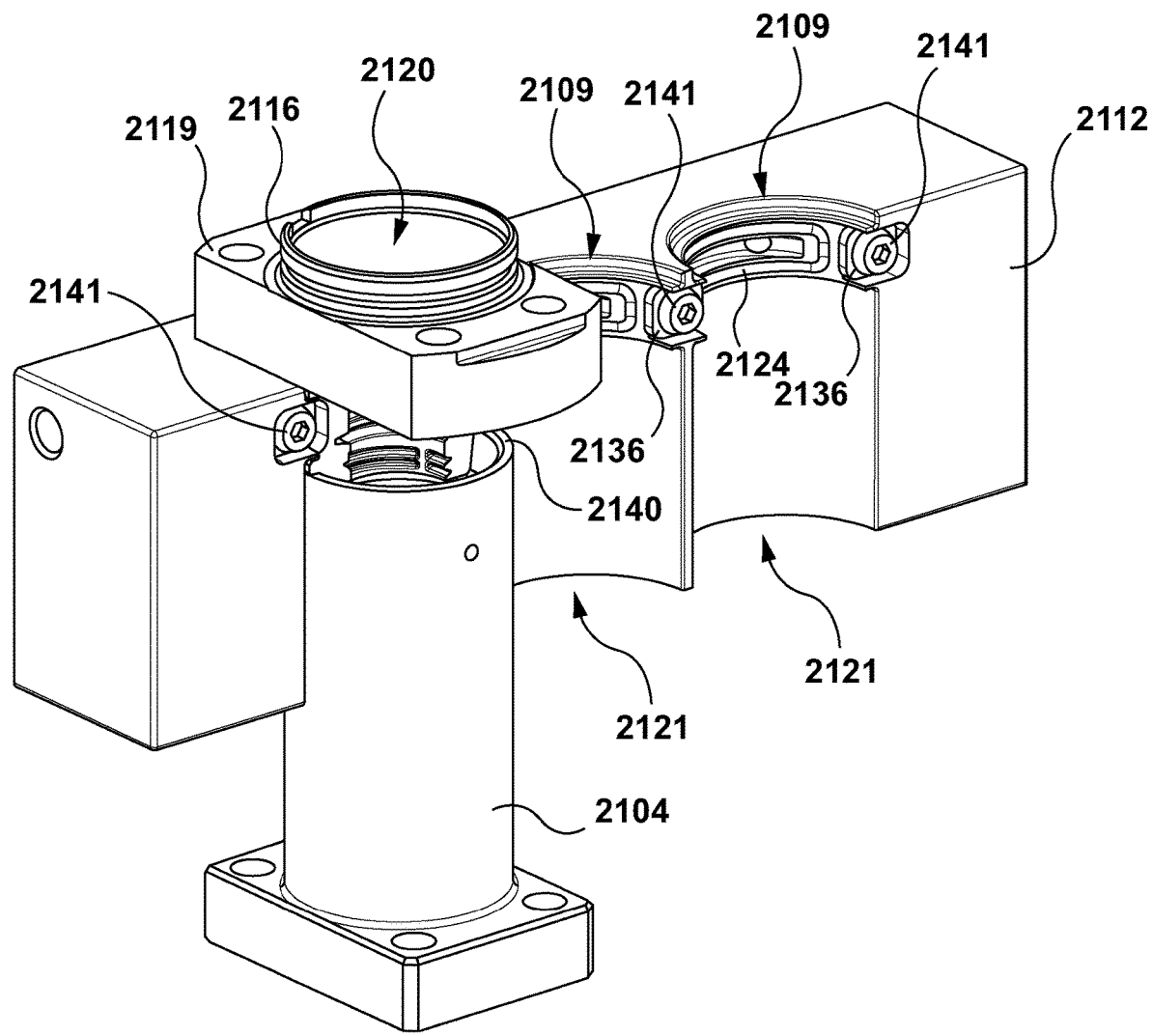
Figure 9A:
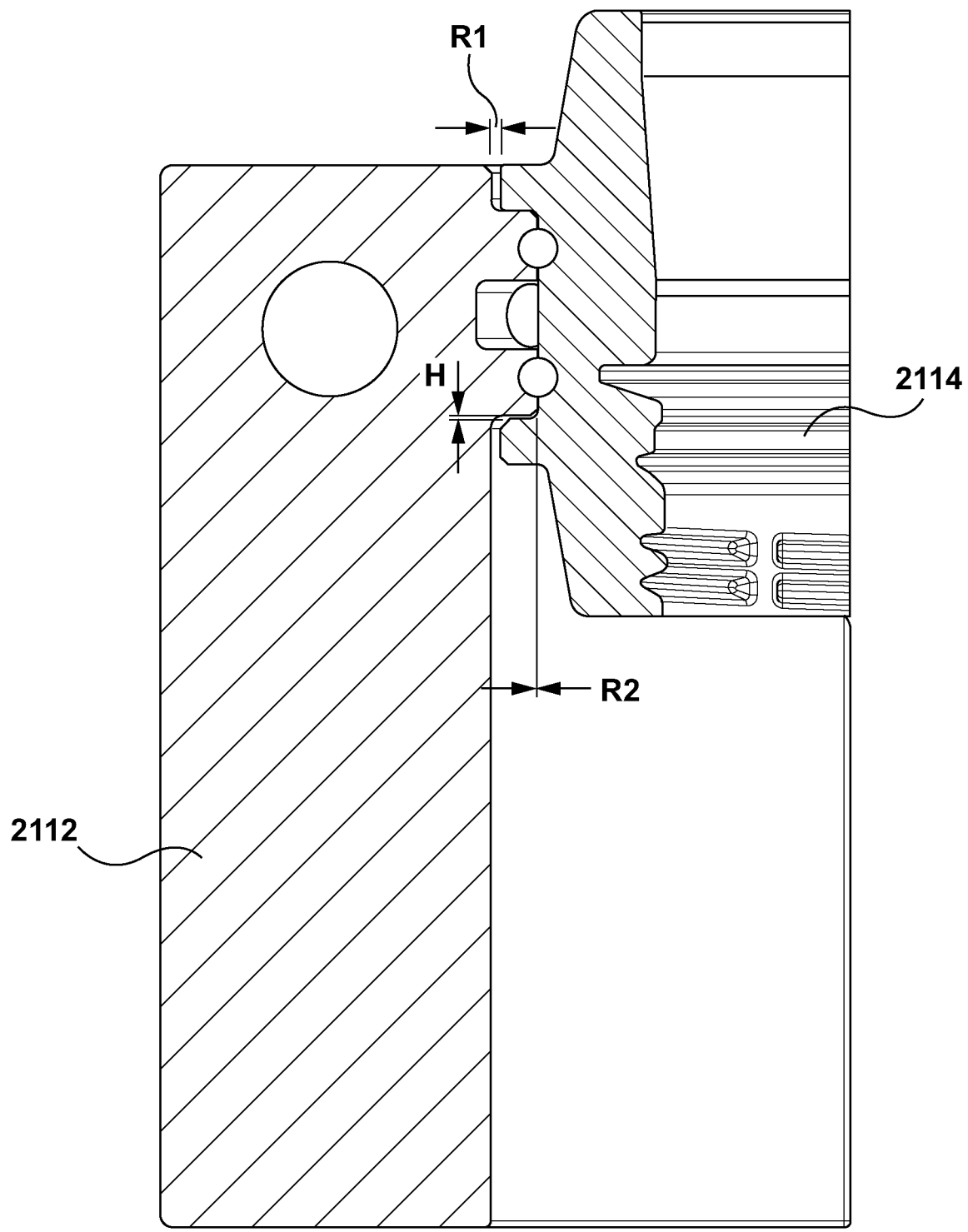
FIGS. 9A and 9B are vertical elevational cross sectional views through the components and part of the mold stack of FIGS. 8A and 8B.
Figure 9B:
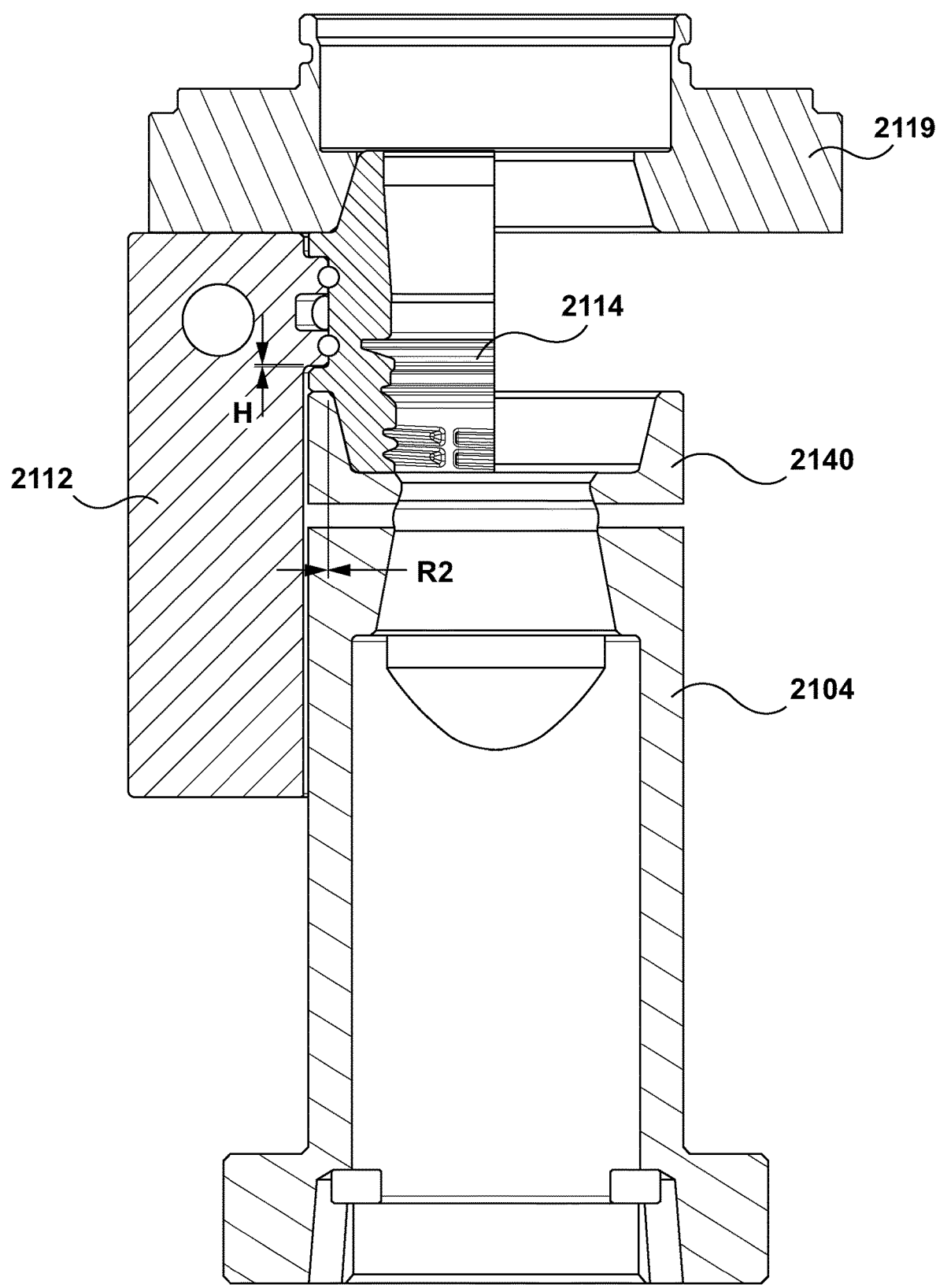

A core alignment taper ring device 2140 may be secured to core support 2104 by screw. Core alignment taper ring device 2140 may have an upper, female tapering annular interface surface which interfaces with a lower male annular tapered interface surface on each pair of neck ring halves 2114 (FIGS. 8A, 8B and 9A).

Associated with the cavity plate (not shown) may be a cavity side alignment taper ring device 2116. Each taper ring device 2116 may be mounted into a cylindrical opening 2120 in a cavity taper retainer plate 2119. Each taper ring device 2116 may be configured and mounted within cylindrical opening 2120 in such a manner that the taper ring device is capable of limited movement relative to the retainer plate 2119 in any one or more of X, Y and/or Z directions.

Each cavity taper retainer plate 2119 may be fixedly mounted to a cavity plate (not shown) on the cavity side. Each taper ring device 2116 has an annular inwardly downward female tapered interface surface which interfaces with an upper male tapered interface surface on each pair of neck ring halves 2114.

Thus, in a manner similar to the first embodiment described above, neck ring halves 2114 are permitted limited freedom of movement in one of both of the radial (lateral/longitudinal) direction and the axial direction relative to their slides 2112 at least during the alignment process, as the mold halves are brought together during operation. Thus neck ring halves 2114, when incorporated with slides 2112 as part of a mold stack, may provide assistance in aligning the cavity and core insert components of the mold stack.

Figure 10:
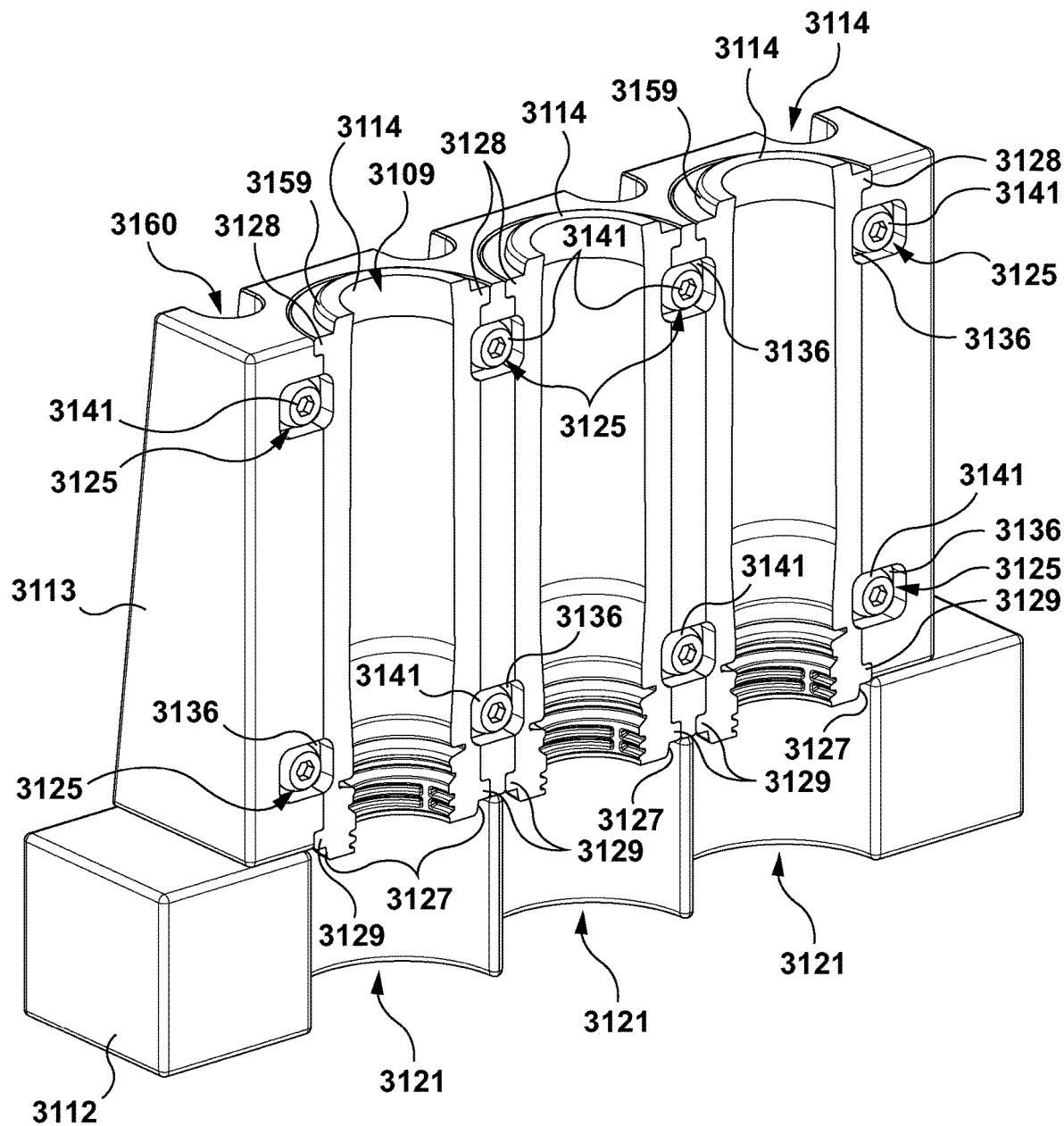
FIG. 10 is a perspective views of an alternate slider with insert holder and neck ring halves.

With reference now to FIG. 10 another alternate embodiment of a movable split mold insert half 3114, a corresponding split mold insert holder 3113 and a slide 3112, is illustrated. Each split mold insert half 3114 may include both a body portion half and a neck ring half. Split mold insert halves 3114 may be configured much like neck ring halves 1114 described above but may be employed to form not only the neck ring portion of a molded article, but also at least a significant portion of the body of the molded article.

The split mold insert assembly in this embodiment may comprise one or a plurality of pairs of slides 3112, only one slide 3112 of which is depicted in FIG. 10. Coupled to each of the pair of slides 3112 may be one or more pairs of respective split mold insert holders 3113. The insert holders 3113 may be fixedly attached to the respective slide 3112 in a suitable coupling arrangement. Each insert holder 3113 may be configured to hold a one or a plurality of split mold insert halves 3114. Each insert holder 3113 may, for example, be fixedly attached to a respective slide 3112 by virtue of screws/bolts having heads and shafts (not shown) being received into cylindrical recessed openings 3160 that extend there through. Heads may be secured in recessed openings and shafts may pass through openings and extend into threaded openings in insert holders 3113 such that insert holders 3113 can be securely affixed to slides 3112. The connection between insert holders 3113 and the respective slides may be enhanced by dowel connections (not shown).

Each slide 3112 may have attached thereto a plurality of insert holders 3113 positioned longitudinally in series along the length of a slide 3112. By providing multiple insert holders 1113 on a slide 1112, this may assist in manufacturing/assembly/replacement of insert holders 1113 and may assist in the replacement/substitution of split mold insert halves 1114, in the molding system.

Each insert holder 3113 may have at opposed longitudinal ends, a generally transversely and vertically oriented, wedge interface surface 3122 which may be male tapered inwardly in an axial direction towards an upper surface of the neck ring holder. Interface surfaces 3122 may, during operation when the mold halves are brought together, create a wedge locking alignment effect with a corresponding interface surface on a component of the cavity half side, such as an interface surface of a cavity insert received in a cavity plate.

Each insert holder 3113 may have a plurality of longitudinally spaced generally semi-cylindrical, axially oriented openings 3109. Receivable within each opening 3109 may be a generally semi-cylindrical split mold insert half 3114. When brought together in a lateral inward direction two opposed split mold insert halves 3114 may form a combined body portion and neck ring portion forming at least a part of a mold cavity for molding an article. When located together, the split mold insert halves 3114 may define, in part, a cavity for a surface profile for a neck region which may provide for a threaded exterior surface of the molded article and provide for a main body portion of the molded article.

Each split mold insert half 3114 may have a generally semi-cylindrical outer surface 3132 and a generally semi-cylindrical inner surface 3135. Inner surface 3135 may have a lower surface profile area 3137 that is suitable for forming a portion of the threads of a neck region for a molded article. Each split mold insert half 3114 may also include a generally semi-circular upper flange 3128 and a generally semi-circular lower flange 3129. Located above upper flange 3128 may be an inwardly upwardly male tapered, interface surface 3159. Located below lower flange 3129 may be an inwardly downwardly male tapered, interface surface 3127.

The outward facing surface 3132 of the split mold insert halves 3114 may include at each opposite ends upper and lower retaining recesses 1130a, 1130b having an inwardly set back and positioned, and radially oriented, retaining surfaces. Retainers 3136 (which may be small plates with apertures there through) may be configured to be received into recesses 3125 in insert holders 3113 and the recesses 3130 in split mold insert halves 3114. Retainers 3136 may be fixedly secured in position within a recess 3125 and one or two recesses 3130 (depending upon whether recess 3125 is an end recess, or an intermediate recess on insert holder 3113) by virtue of screws 3141 passing through the central openings in retainers 3136, with the screws being held in threaded openings in retaining surfaces in recesses 3125. Each retainer 3136 may have its surface facing retaining surface spaced apart from the retaining surface 3131 of the split mold insert half/halves 3114. By positioning a retainer 3136 in each upper and lower recess 3125 at either side of an opening 3109, a spilt mold insert half 3114 may be loosely retained within an opening 3109, as its retaining surface is unable to pass by the corresponding retainer 3136. However, retainers 3136 and the configuration of recesses 3130 permit a limited degree of longitudinal, transverse and axial movement of each spilt mold insert 3114 relative to the opening 3109 in which it is positioned.

When each split mold insert half 3114 is held in an opening 3109, before the two mold halves are brought together, the spilt mold insert halves 3114 and corresponding openings 3109 are configured such that radial movement (both laterally and longitudinally) and axial movement are permitted of the spilt mold insert halves 3114 relative to the opening 3109 of neck ring holder 1113 in a manner similar to that described above. By way of example, there may be radial gaps around the entire semi-circumference between the outer surfaces of each split mold inset half 3104 and the inward facing surfaces of insert holder 3113. These gaps may, for example be each in the range of 30 to 80 microns. Similarly, there may be a total height gap H of in the range of 30 to 80 microns between the transverse/longitudinal surfaces of the insert holders 3113 and the downward facing surfaces of upper flange 3128. And there may also be a total height gap H of in the range of 30 to 100 microns between the transverse/longitudinal surfaces of the insert holders 3113 and the upward facing surfaces of lower flange 3129.

The result of the foregoing, is that each split mold insert half 3114 may move both radially (longitudinally/transversely) and axially relative to its insert holder 3113 and the respective slide 3112. As the mold is brought into a closed position the split mold insert halves 3114 may move relative to respective insert holders 3113 and slides 3112, permitting better alignment. And similar to the above referenced embodiment, tapered outer surfaces of insert holders 3113 will assist in holding the mold assembly in a closed configuration.

Also, similar to the embodiment described above, the interior surfaces defining semi-cylindrical openings 3109 in insert holders 3113 may include cooling channels formed between the outer surface 1132 of the spilt mold inset half 3114 and the corresponding interior adjacent surface of insert holder 1113 defining the opening 3109. Coolant may be fed though channels in the slide 3112 in communication with channels the insert holders 1113 to supply coolant to circulate through channels.

Insert holders 3113 may be sealed by seal devices such as O-rings held in recesses in a rear portion of the interior, generally semi-cylindrical, surfaces defining openings 3109. O-rings may be resilient and elastically deformable and thus function to tend to push against each spilt mold inset half 3114 held in an opening 3109 to urge the spilt mold insert half transversely outwards from the opening 3109.

In a mold closed position, a portion of a core insert, a portion of the spilt mold inset halves 3114 and insert holders 3113 (along with a portion of a cavity insert and a portion of a gate insert not shown) may cooperate to define a molding cavity.

As indicated above, split mold insert halves 3114 are capable of radial (transverse/longitudinal) movement and/or axial movement, when held in the openings 3109, as the mold halves are brought together, thus allowing for the movement of the pairs of spilt mold insert halves 3114 to assist in properly aligning the core and core insert components with the cavity insert components, when the split mold insert halves 3114 engage with one or more other components having tapered surfaces that can engage with the tapered surfaces of the pairs of split mold insert halves 3114.

With reference now to FIGS. 11A, 11B, 12, 13, and 14A-C, another alternate embodiment of movable neck ring halves 4114 and corresponding slides 4112 is illustrated. The split mold insert assembly in this embodiment may comprise one or a plurality of pairs of slides 4112, only one slide 4112 of which is depicted in FIGS. 11A, 11B, 12, 13, and 14A-C. Coupled to each of the slides 4112 may be one or more respective neck ring halves 4114 such that the slides 4112 are support devices for neck ring halves 4114.

With particular reference to FIGS. 11B and 14A-C, each slide 4112 may have a plurality of longitudinally spaced, generally semi-cylindrical, axially oriented openings 4109, each of which may also include an upper, generally cylindrical platform recess 4106. Each platform recess 4106 may be defined in part by a generally cylindrical rear surface 4106*a* extending axially from the upper generally planar, transversely and longitudinally extending surface 4112*a* of the slide 4112 and also include a transversely and longitudinally extending platform portion 4106*b* that is generally parallel to upper surface 4112*a* and which is recessed below the upper surface 4112*a* of slide 4112. The rear surface 4106*a* of each platform recess 4106 may terminate at each end and adjoin an intermediate wall surface 4705 of slide 4112. Wall surface 4705 may extend axially and may be generally arcuate. Intermediate wall surfaces 4705 may be situated between and link rear wall surfaces 4106*a* of platform recesses 4106 of adjacent openings 4109. At each end of each slide 4112, an axially extending, generally arcuate wall surface 4707 within slide 4112 may also be provided that may cover an angle of between about 180 degrees and 270 degrees of a cylindrical surface (see FIG. 11B).

Each opening 4109 may also include a lower portion 4109*a* defined generally by an inward facing, generally semi-cylindrical, surface 4701. Receivable within each opening 4109 may be a generally semi-cylindrical neck ring half 4114.

Figure 11A:
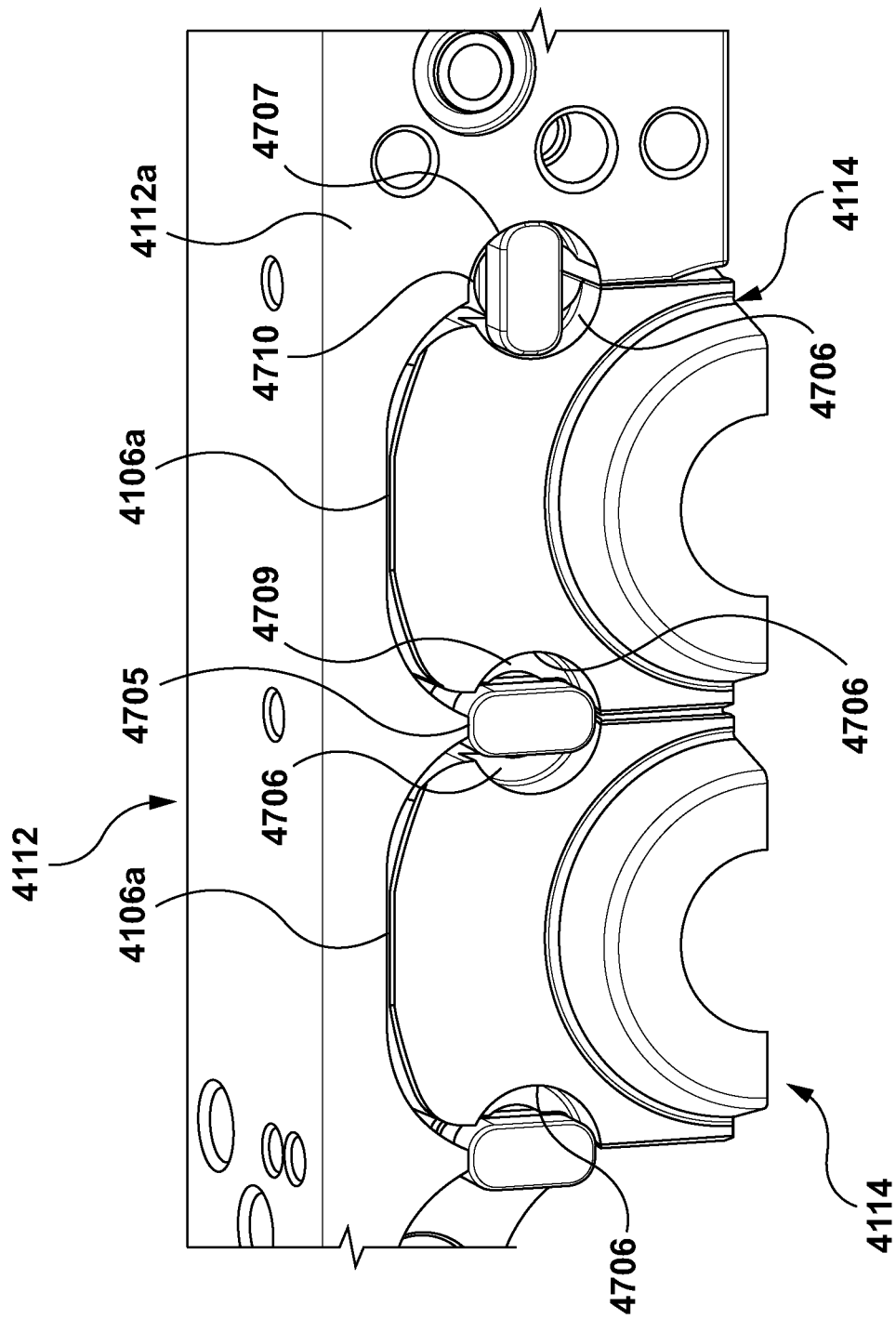
FIGS. 11A and 11B are top perspective views of another alternate slider and neck ring halves.
Figure 11B:
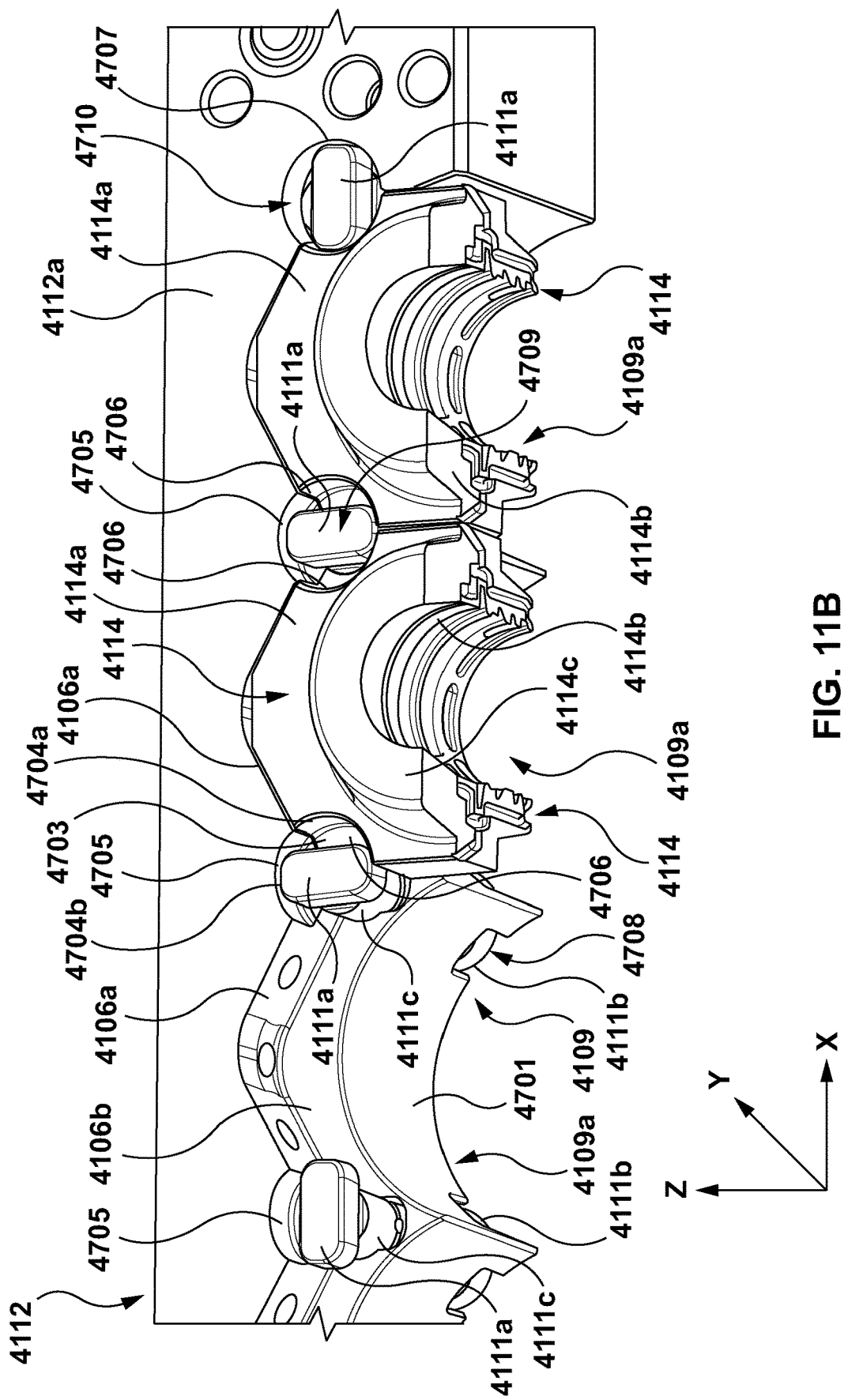
Figure 12:
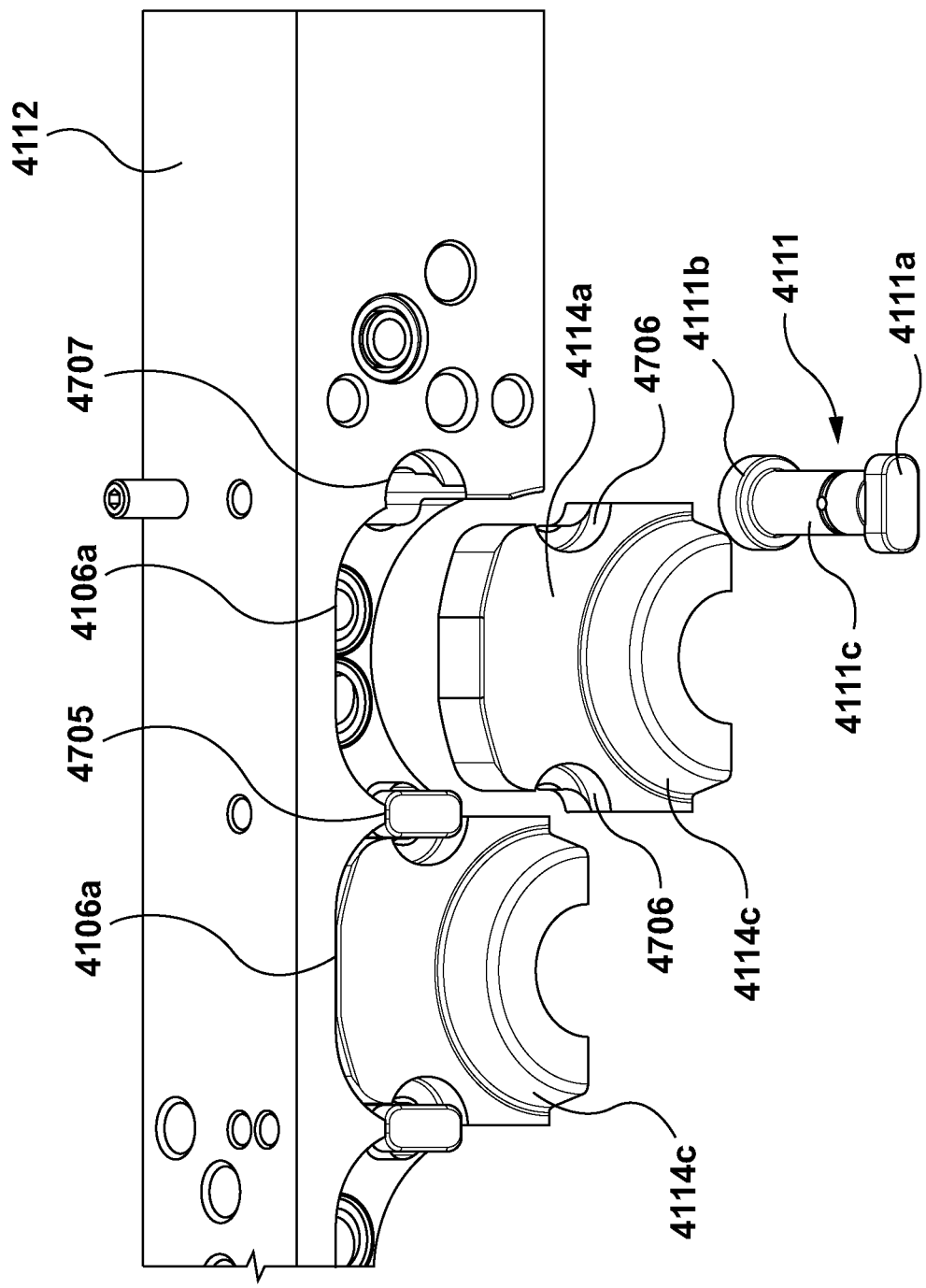
FIG. 12 is a top perspective view of the slider and neck ring halves of FIGS. 11A and 11B with a neck ring halve and removed from the slider.
Figure 13:
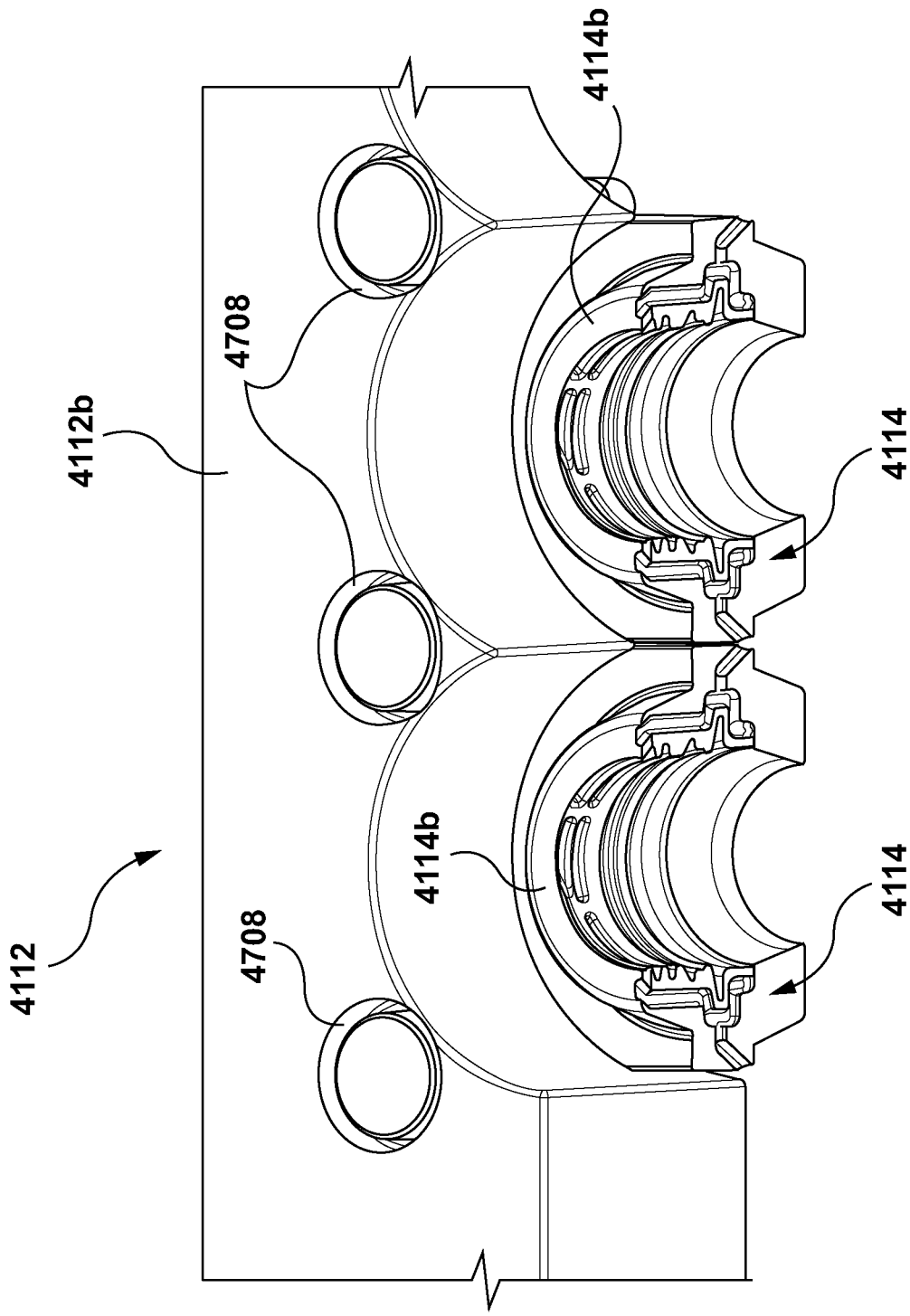
FIG. 13 is a bottom perspective view of the slider and neck ring halves of FIGS. 11A and 11B.

With reference to FIGS. 11B and 12, neck ring halves 4114 may include an upper, generally arcuate, half ring portion 4114*c*, a medial flange portion 4114*a* and a lower generally semi-cylindrical portion 4114*b*. Each neck ring half 4114 may be receivable in an opening 4109 with flange portion 4114*a* receivable in and positioned on and within the platform recess 4106 of slide 4112; and the lower cylindrical portion 4114*b* receivable in the region of opening 4109 defined by generally semi-cylindrical surface 4701. Upper half ring portion 4114*c* may extend axially above the surface level of slide surface 4112*a* and may have tapered side surfaces that may be suitable for engaging with corresponding tapered surfaces on for example, a cavity insert component on the cavity side of a mold.

The flange portion 4114*a* of each neck ring half 4114, may have axially extending, generally arcuate, side wall portions 4706 (see FIG. 11A) at each longitudinal side. Wall portions 4706 of neck ring halves 4114 may terminate at one end at an adjacent end of an intermediate arcuate wall surface 4705 of slide 4112. As indicated above, intermediate wall surfaces 4705 of slides 4112 may be situated between, and link, rear wall surfaces 4106*a* of platform recesses 4106 of adjacent openings 4109. Intermediate wall surfaces 4705 may be configured of varying lengths (e.g. compare FIG. 11B and FIGS. 11A, 14A), and in some embodiments an intermediate wall surface may not be provided at all.

The opposite, outer end of each wall portion 4706 of a neck ring half 4114 may terminate at a location adjacent the corresponding end of a wall portion 4706 of an adjoining neck ring 4114.

However, for a neck ring half 4114 that is received in an opening 4109 that is at a longitudinal end of slide 4112 the opposite end of each axially wall portion 4706 may terminate at the inward end of an axially oriented, arcuate wall surface 4707 of slide 4112. The result is that when a pair of adjacent neck ring halves 4114 are received into an intermediate opening 4109, a generally cylindrical upper recess 4709 (FIG. 11A) is created there between. When a neck ring half 4114 is received into an opening 4109 at an end of slide 4112, a generally cylindrical end upper recess 4710 is created.

With particular reference to FIGS. 13 and 14A-C, at the bottom surface 4112*b* side of slide 4112 is located a plurality of lower cylindrical recesses 4708 within the lower surface 4112*b* of slide 4112. Each upper cylindrical recess 4707 and lower cylindrical recess 4708 are connected by a narrower, central opening portion 4702 that passes vertically through slide 4112 between the upper recess and the lower recess (see FIGS. 14A and 14B).

The lower semi-cylindrical portion 4114*b* of each neck ring half 4114 may have a generally semi-cylindrical outer surface and a generally semi-cylindrical inner surface. When brought together in a transverse (direction Z) inward direction, the inner surfaces of the lower portions 4114*b* of two opposed neck ring halves 4114 may form a combined neck ring cavity portion forming at least a part of a mold cavity for molding an article. When located together, the neck ring halves 4114 may define, in part, a cavity for a surface profile for a neck region which may provide for a threaded exterior surface of the molded article and provide for a main body portion of the molded article.

As indicated above, each neck ring half 4114 may be received in a respective opening 4109 of a slide 4112 with the upper flange portion 4114*a* received in the platform recess 4106 of slide 4112; and the lower cylindrical portion 4114*b* received in the region of opening 4109 defined by generally semi-cylindrical surface 4701. Each neck ring half 4114 may be held in the opening 4109 by a pair of retainer members 4111 located on opposed longitudinal sides proximate the respective opening 4109. Each retainer member 4111 may be made from any suitable material such as a metal such as AISI 4140 alloy steel or AISI grade 420 stainless steel.

Each retainer member 4111 may be oriented axially and received in an upper cylindrical recess 4707/4710, central opening portion 4702 and lower cylindrical recess 4708. Each retainer member 4111 may have a shaft portion 4111*c*, an upper generally cuboid shaped head 4111*a*, and a lower generally circular disc portion 4111*b*(see FIG. 12). Each retainer member 4111 may be receivable and rotatable within the upper recess 4709, central opening 4702, and lower recess 4708. When positioned in upper recess 4709, central opening 4702, and lower recess 4708, each retainer member 4111 is rotatable about its longitudinal axis between: (a) a first position in which head portion 4111*a* of retainer member 4111 is oriented in a transverse direction (Z direction in FIGS. 11B and 14B); and (b) a second position in which the head portion 4111*a* of retainer member 4111 is oriented in a longitudinal direction (X direction in FIGS. 11B and 14B). When the retainer member 4111 is in the first position, the head portion 4111*a* does not block the flange portion 4114*a* of a neck ring 4114 from passing into the platform recess 4016 such that the flange portion 4114*a* of the neck ring 4114 may be received into and rest on the platform 4106*b* and arcuate side surfaces 4706 form part of the generally cylindrical side walls of upper recesses 4709.

Once each neck ring half 4114 has been inserted into an opening 4109, a retainer member 4111 located in the opening/recesses at each side can be moved from the first position to the second position. In the second position, the head portion 4111*a* will block axial movement that would allow neck ring 4114 to be removed from opening 4109, and will, to a significant extent, hold the neck ring half 4114 from substantial axial movement. The lower disc portion 4111*b*of the retainer member 4111 will be restrained from substantial upwards movement relative to the slide 4112 by the downward facing surface of recess 4708 abutting with the upward facing surface of disc portion 4111b(see FIG. 14B) However, gaps may be provided between the interface 4712 (FIG. 14A) of upper surface of the flange portion 4114a of a neck ring 4114 and an engaging lower surface of head portion 4111a of retainer member 4114a, and between the downward facing surface of recess 4708 and the upward facing surface of disc portion 4111b, that together will allow a small amount of axial up/down movement of neck ring 4114 relative to the slide 4112.

With respect to movement in a transverse (Z) direction, when the retainer member 4111 is in the first position, the head 4111a of retainer member 4111 does not block the flange portion 4114a of a neck ring 4114 from movement in the transverse direction. The shaft portion 4111c of each retainer member 4111 has clearance for rotation within central opening portion 4702, and generally circular disc portion 4111band upper head portions 4111a also clearance for rotation within lower recess 4708 and upper recesses 4709/4710, of slide 4112.

When each retainer member 4111 is moved to the second position when a neck ring half 4114 is seated in the corresponding opening 4109, head portion 4111a will block neck ring half 4114 from outward transverse movement as head portion 4111a will engage with a rear portion of arcuate surface 4706. However, a small amount of transverse movement of neck ring half 4114 relative to the opening 4109 of slider 4112 is permitted by the configuration of the components including retainer 4111.

The result is that when a neck ring half 4114 is inserted into an opening 4109, retainer member 4111 can be moved from the first position to the second position. In the second position, retainer 4111 will hold the neck ring half in opening 4109 but will allow both a small amount axial movement (e.g., 0.01 mm to 0.1 mm and a small amount of transverse movement e.g. 0.01 to 0.05 mm.

When each neck ring half 4114 is held in an opening 4109, before the two mold halves are brought together, the neck ring halves 4114 and corresponding openings 4109 are configured such that radial movement (both laterally and longitudinally) and axial movement may also/alternatively be permitted relative to the opening 4109 of slide 4112 in a manner similar to that described above.

Figure 15A:
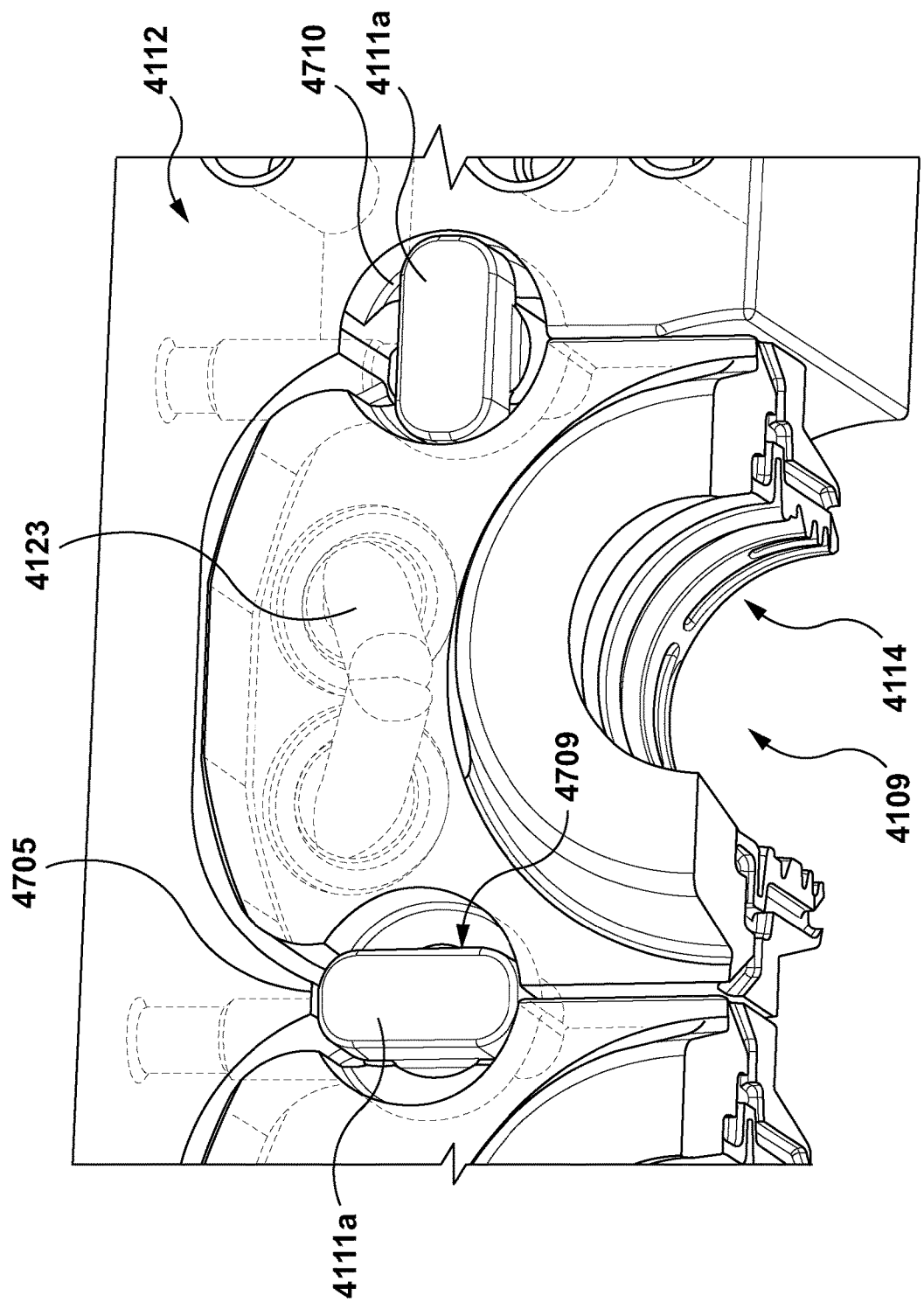
FIGS. 15A and 15B are enlarged top and bottom perspective views, respectively, of part of the slider and a neck ring halve of FIGS. 11A and 11B.
Figure 15B:
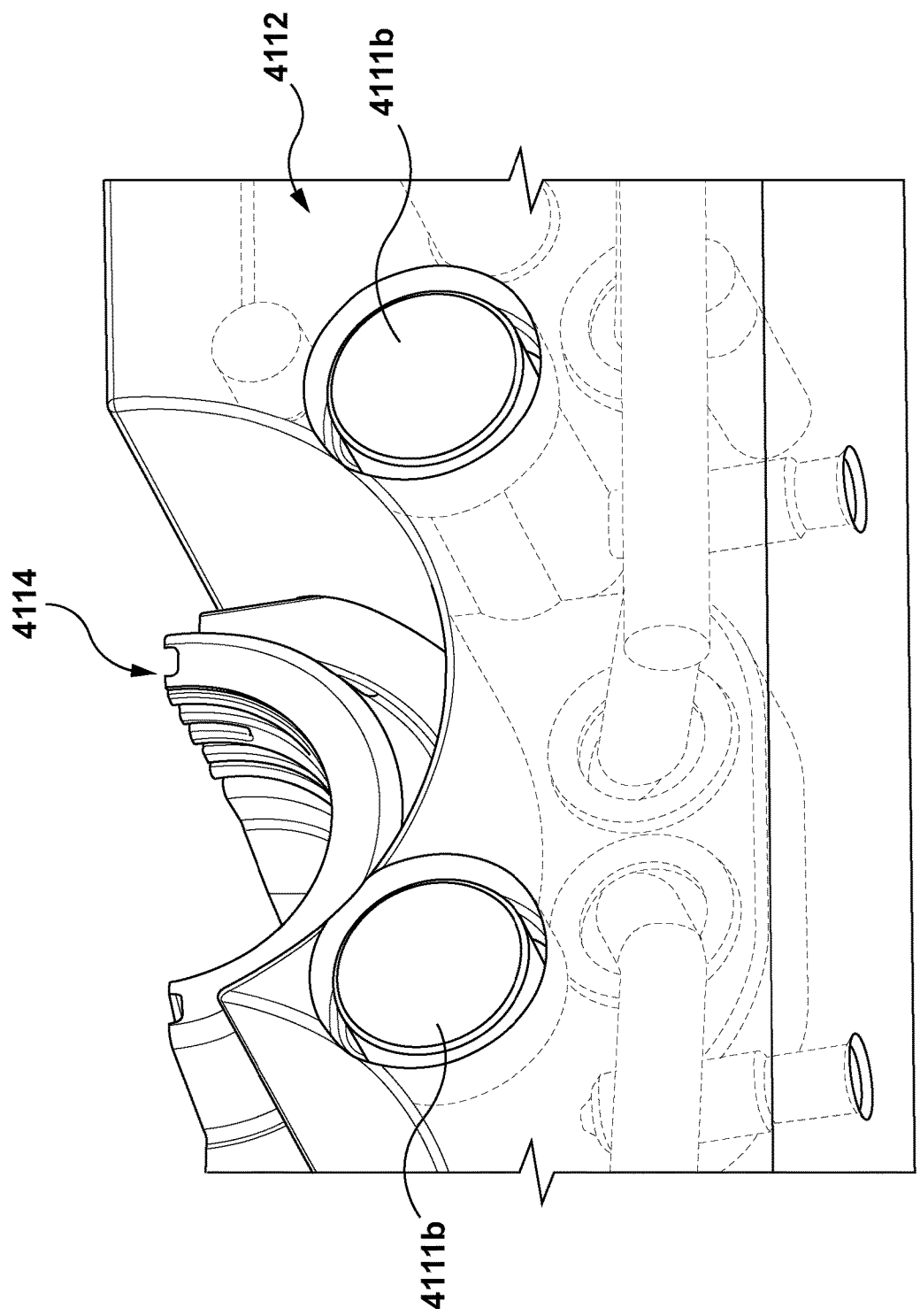

With reference to FIGS. 15A and 15B, cooling channels may be provided though slide 4112 into each neck ring half 4114. Coolant may be fed though channels in the slide 4112 in communication with channels 4123 in neck ring halves 4114 to supply coolant to circulate through channels 4123.

In a mold closed position, a portion of a core insert, a portion of the neck ring halves 4114 (along with a portion of a cavity insert and a portion of a gate insert not shown) may cooperate to define a molding cavity.

As indicated above, neck ring halves 4114 are capable of radial (transverse/longitudinal) movement and/or axial movement, when held in the openings 4109, as the mold halves are brought together, thus allowing for the movement of the pairs of neck ring halves 4114 to assist in properly aligning the core and core insert components with the cavity insert components, when the neck ring halves 4114 engage with one or more other components having tapered surfaces that can engage with the tapered surfaces of the upper ring portions 4114c of the neck ring halves.

Figure 18:
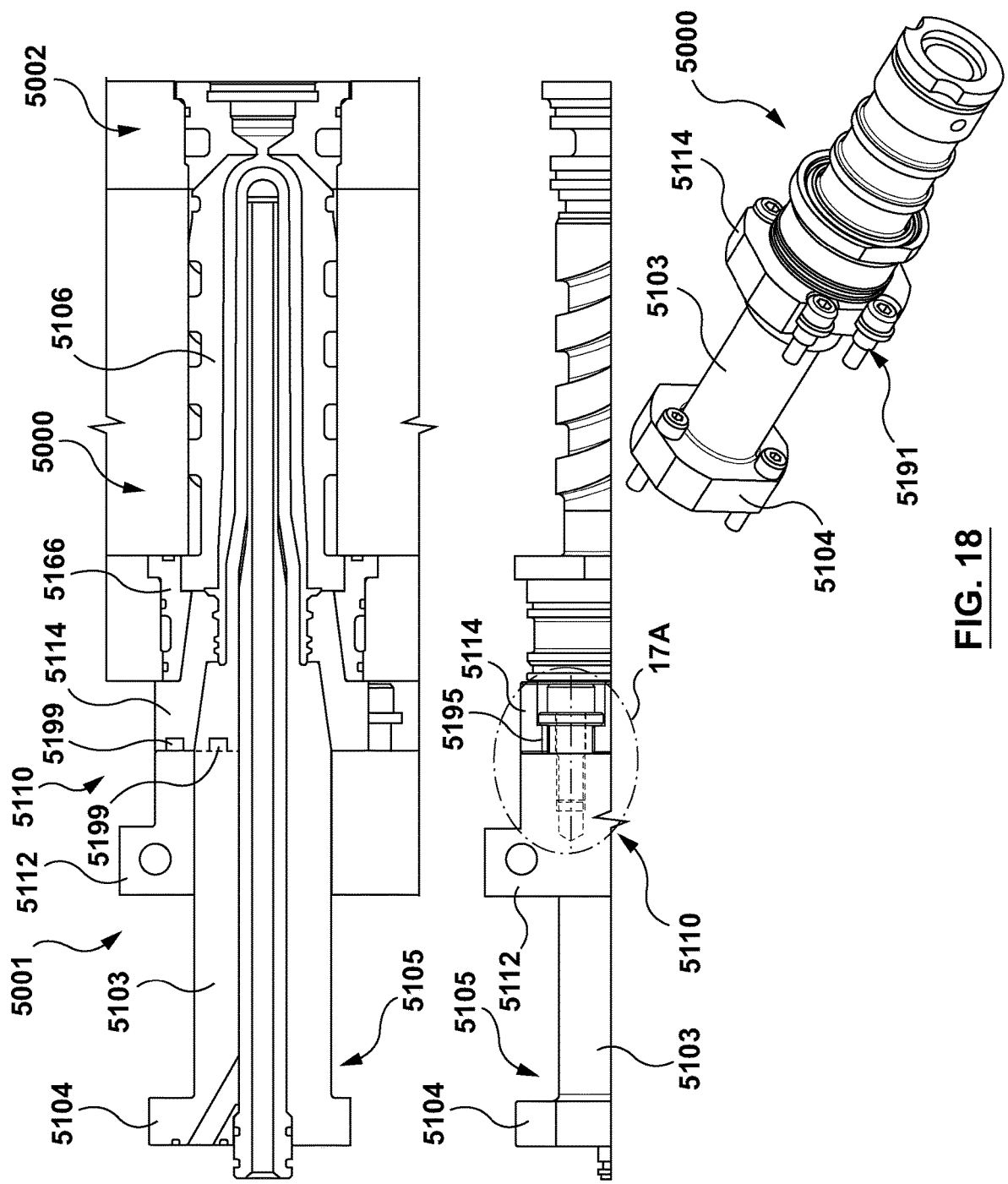
FIG. 18 provides cross sectional and perspective views of a mold stack incorporating the neck ring of FIG. 16.

With reference now to FIG. 18 some components are illustrated of a mold stack 5000 with a core half 5001 and a cavity half 5002 that may be generally configured like the aforementioned and described mold stacks. Core half 5001 may comprise a core plate (not shown) and a stripper plate (not shown). Core half 5001 may also include a core insert 5105. Core insert 1105 may include a core 5103 and a core support pedestal 5104.

Each split mold insert assembly 5110 may comprise one or a plurality of pairs of slides 5112. Coupled to each of the pair of slides 5112 may be one or more pairs of respective neck ring halves 5114. A plurality of neck ring halves 5114 may be positioned longitudinally adjacent to each other on one slide 5112 opposite to a corresponding plurality of neck ring halves 5114 positioned longitudinally adjacent to each other on an opposed slide 5112.

Each neck ring half 5114 may generally be configured conventionally but may be configured to be secured to a slide 5112 with one or more (e.g. two) retainer mechanisms 5192. Each retainer mechanism 5192 may include a retainer member 5111 and an insert member 5191. Each retainer member 5111 may have a head portion 5111a and a shaft portion 5111b. Each retainer member 5111 may be a threaded screw with a head.

Each insert member 5191 may have: an upper annular flange portion 5191a; a cylindrical body portion 5111bextending axially from the flange portion 5111a; and a cylindrical opening 5191c extending axially through the flange portion 5111a and the body portion 5111b.

Each neck ring half 5114 may have a semi-cylindrical central opening 5109. When a pair of neck ring halves 5114 are brought together during operation of an injection molding system, the inward surfaces providing opening 5109 of the neck ring halves 5114 will define the profile for a neck region of an article to be molded. Each neck ring half 5114 will be held to a corresponding slide 5112 by a pair of retainer mechanisms 5192 at each longitudinal side of the neck ring half.

Neck ring halves 5114 may include an upper, generally arcuate, half ring portion 5114a and a flange portion 5114b. Upper half ring portion 5114a may have tapered side surfaces 5114c that may be suitable for engaging with corresponding tapered surfaces on for example, a cavity insert component on the cavity side of a mold.

Figure 17A:
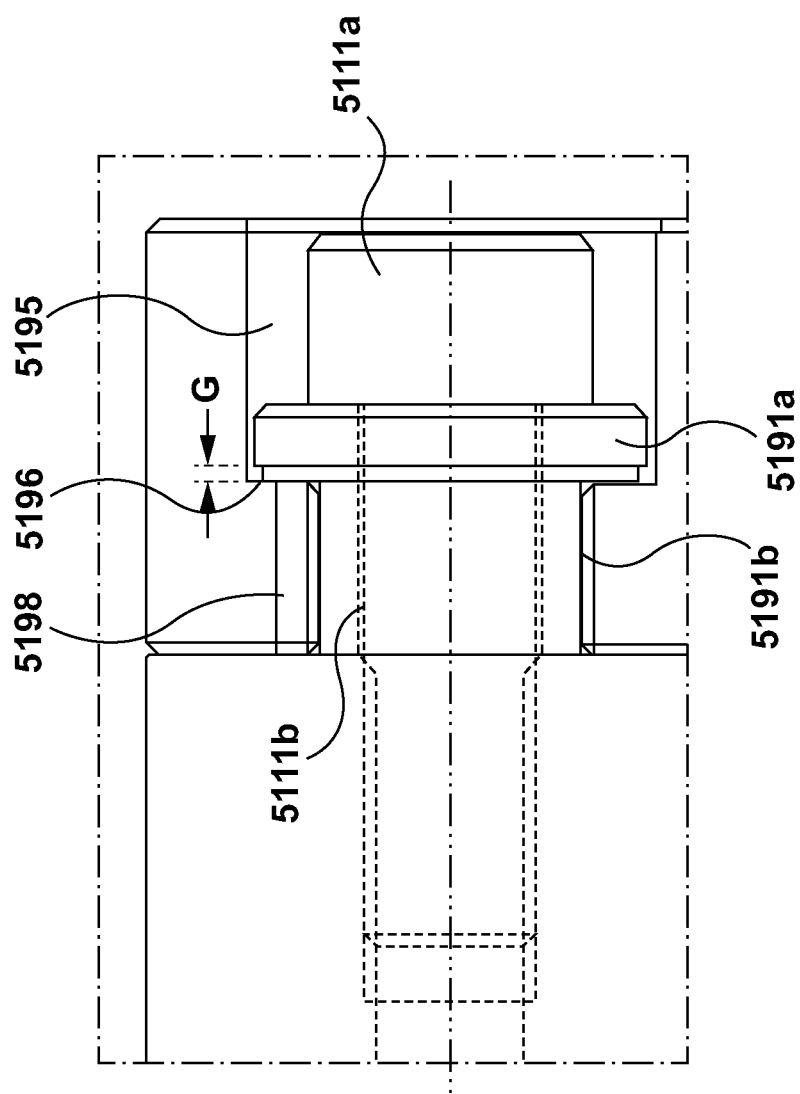
FIGS. 17A, 17B and 17C are sectional profile views of part of the neck ring configuration of FIG. 16.
Figure 17B:
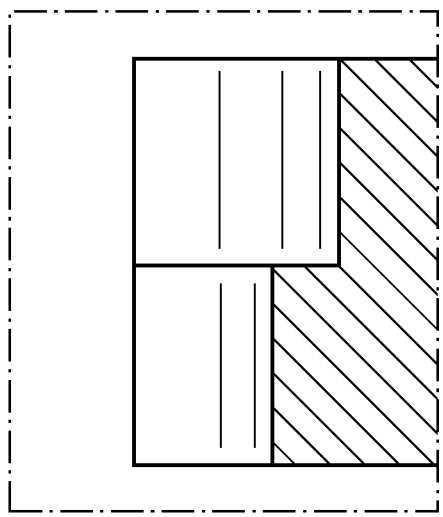
Figure 17C:
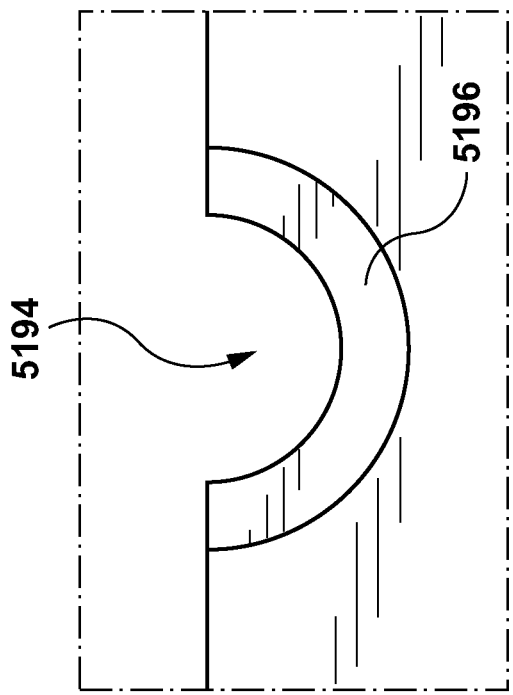

Each neck ring half 5114 may also have a pair of longitudinally opposed, generally stepped, semi-cylindrical side apertures 5194. Each aperture 5194 may have a passageway that passes all the way through the flange portion 5114b. When a pair of neck ring halves 5114 are positioned longitudinally adjacent to each other on a slide 5112, a cylindrical opening 5195 (FIG. 17A-C and 18) is formed by the two adjacent apertures 5194. Those openings 5195 are configured to receive retainer mechanisms 5192. The openings 5195 may comprise a central channel 5198 that extends all the way through the side of flange portion 5114b of the neck ring half 5114. The openings 5195 also comprise a recessed platform 5196 (FIG. 17A). The depth of the recessed platform 5196 is specifically provided to position the flange portion of 5191a of the insert member 5191 such that a gap is formed between the lower surface of the flange portion 5191a and the upward facing opposite surface of the recessed platform 5196. That gap may be in the range of 0.01 to 0.03 mm.

O-rings 5199 (FIG. 18) may be provided between the neck ring halves 5114 and slides 5112. O-rings 5199 may provide a seal for cooling passages communicating between slides 5112 and neck rings 5114. The O-rings 5199 may also push the neck rings 5114 away from the surface of slides 5112 to facilitate sliding/floating of the neck rings when pushed by the tapered surface interfaces. The aforementioned gap may be small enough to maintain compression of the O-Rings 5199 on the back surface of the neck ring 5114, but will still allow the neck rings to 'float' or move when pushed by the tapered interfacing surfaces.

This gap allows the neck ring half 5114 to move a small axial distance relative to the underlying slide 5112 to which it is attached by retainer members 5111 which are fixedly screwed to and axially positioned relative to the underlying slide 5112. Thus, the retainer members 5115 hold the insert members 5191 in position but retainer members 5115 allow the neck ring halves 5114 a limited amount of axial movement relative to the underlying slide 5112.

Figure 16:
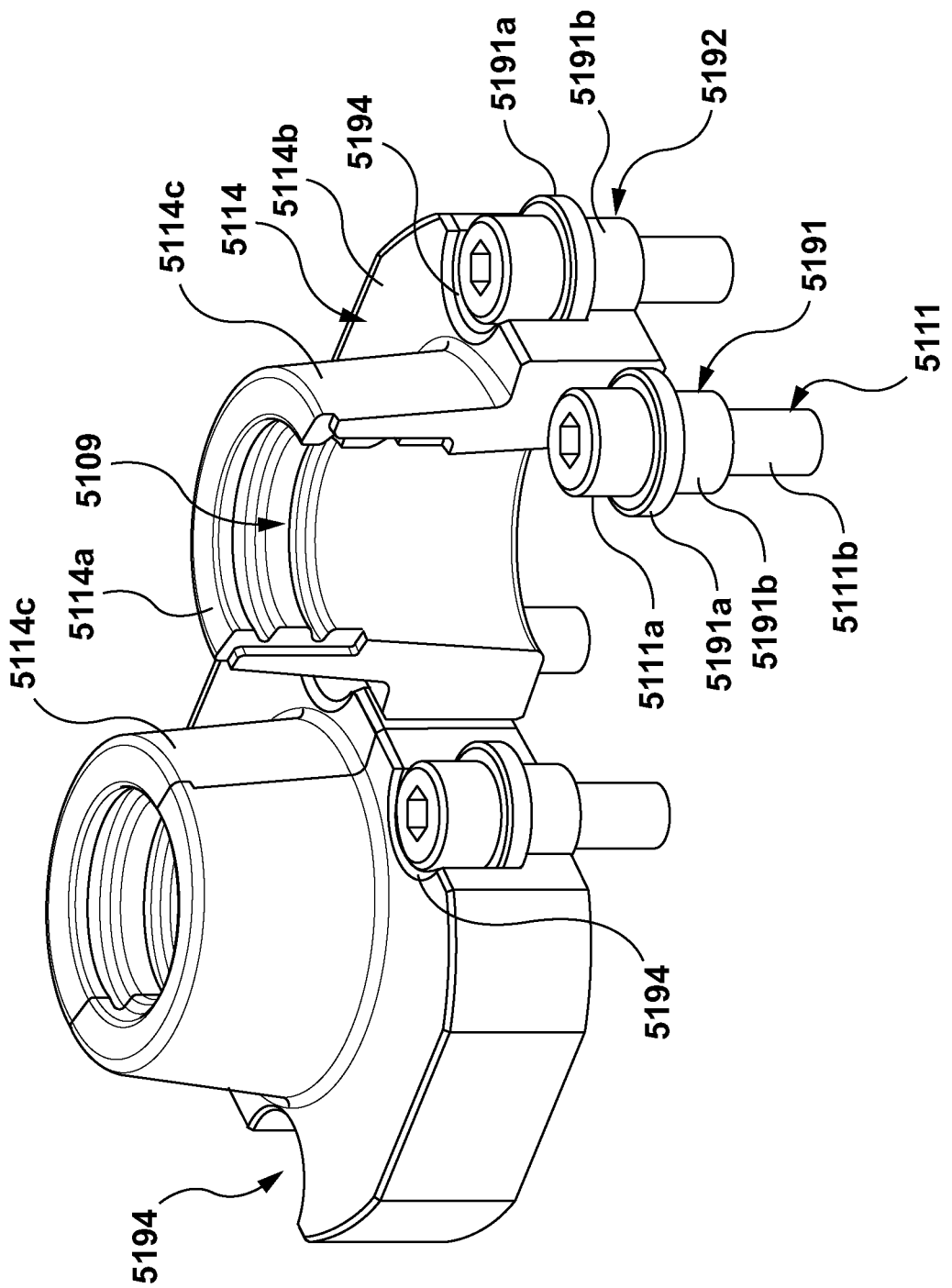
FIG. 16. Is a perspective view of another alternate neck ring configuration.

As indicated above, neck ring halves 5114 are capable of axial movement relative to their respective slides 5112, as the mold halves are brought together, thus allowing for the movement of the pairs of neck ring halves 5114 to assist in properly aligning the core and core insert components with the cavity insert components, when the neck ring halves 5114 engage with one or more other components having tapered surfaces that can engage with the tapered surfaces 5114c (FIG. 16) of the neck ring halves 5114.

In this embodiment of FIG. 18, a cavity insert 5106 and cavity flange 5116 may be provided in the mold stack. Cavity insert 5106 and/or cavity flange 5116 can be implemented as a compensating cavity insert/compensating cavity flange insert in using known compensation mechanisms. A compensating cavity insert 5106 and/or compensating cavity flange 5166 may be align their position with the position of the neck ring halves 5114. An example of a cavity insert movement compensating mechanism is disclosed in U.S. Pat. No. 7,575,429, referenced above.

The above described embodiments are intended to be illustrative only and in no way limiting. The described embodiments of carrying out the invention are susceptible to many modifications of form, arrangement of parts, details and order of operation. Other variations are possible.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

What is claimed is:

1. A split mold insert apparatus operable for connection to a slide of an injection molding system, said slide operable for lateral movement, said spilt mold insert apparatus comprising:
    a split mold insert comprising a body having an inner surface configured in use to form a surface of part of a mold cavity for forming at least part of a neck region of an article, and a semi-cylindrical outer surface having a semi-circular upper flange and a semi-circular lower flange;
    a support device having a semi-cylindrical opening operable to receive the semi-cylindrical outer surface of the split mold insert and to support said split mold insert via a retaining mechanism;
    wherein said retaining mechanism comprises a first retainer plate held within a first recess proximate a lateral edge of a longitudinally and vertically oriented outward facing surface of said split mold insert and an adjacent recess on an outer face of the support device;
    said support device operable for holding said split mold insert and permitting movement of said split mold insert relative to said support device during use of said system;
    a resilient and elastically deformable member positioned between an inner surface of said semi-cylindrical opening of the support device and the semi-cylindrical outer surface of said split mold insert to allow said split mold insert limited movement in one or more of an axial, longitudinal, and transverse direction with respect to said support device;
    wherein radical gaps are provided around an entire semi-cirsumfrence between the semi-cylindrical outer surface of said split insert and said inner surface of said semi-cylindrical opening of the support device, and height gaps are provided between surfaces of the support device and a downward facing surface of said upper flange and an upward facing surfaces of lower flange.

2. An apparatus as claimed in claim 1 wherein in use of said injection molding system, said split mold insert apparatus is operable such that said split mold insert is movable relative to said support device to facilitate alignment of at least one component of a mold stack that is adjacent to said split mold insert.

3. An apparatus as claimed in claim 1 wherein said split mold insert is movable relative to said support device in an axial direction.

4. An apparatus as claimed in claim 1 wherein said split mold insert is movable relative to said support device in a longitudinal direction.

5. An apparatus as claimed in claims 1, wherein said split mold insert is movable relative to said respective support device in a transverse direction.

6. An apparatus as claimed in claim 1 wherein said support device is a slide of a stripper assembly of an injection molding system.

7. An apparatus as claimed in claim 6 wherein said split mold insert is directly connected to said slide such that during operation of said injection molding system, said split mold insert is movable relative to said slide.

* * * * *